US008123983B2

(12) United States Patent
Komatsu et al.

(10) Patent No.: US 8,123,983 B2
(45) Date of Patent: Feb. 28, 2012

(54) ACTUATOR ELEMENT

(75) Inventors: Yuzo Komatsu, Settsu (JP); Keiko Hirata, Settsu (JP); Haruhiko Mohri, Settsu (JP); Hirokazu Aoyama, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 410 days.

(21) Appl. No.: 12/161,275

(22) PCT Filed: Jan. 22, 2007

(86) PCT No.: PCT/JP2007/050911
§ 371 (c)(1),
(2), (4) Date: Jul. 17, 2008

(87) PCT Pub. No.: WO2007/088746
PCT Pub. Date: Aug. 9, 2007

(65) Prior Publication Data
US 2010/0164330 A1    Jul. 1, 2010

(30) Foreign Application Priority Data
Feb. 3, 2006    (JP) ................................. 2006-027555

(51) Int. Cl.
*H01B 1/00*    (2006.01)
(52) U.S. Cl. ........ 252/500; 310/311; 310/364; 310/365; 310/800; 528/481
(58) Field of Classification Search ................... 252/500; 204/282; 310/800, 311, 264, 365, 364; 429/316; 528/481
See application file for complete search history.

(56) References Cited

U.S. PATENT DOCUMENTS

| 3,506,635 | A | * | 4/1970 | Anderson | 528/481 |
|---|---|---|---|---|---|
| 5,268,082 | A | | 12/1993 | Oguro et al. | |
| 5,977,685 | A | | 11/1999 | Kurita et al. | |
| 7,315,106 | B2 | | 1/2008 | Asaki et al. | |
| 7,553,589 | B2 | * | 6/2009 | Araki et al. | 429/316 |
| 2005/0103706 | A1 | | 5/2005 | Bennett et al. | |
| 2005/0122007 | A1 | * | 6/2005 | Ishibashi et al. | 310/800 |
| 2005/0170255 | A1 | | 8/2005 | Koh et al. | |
| 2005/0233221 | A1 | | 10/2005 | Araki et al. | |
| 2006/0266642 | A1 | * | 11/2006 | Akle et al. | 204/282 |
| 2006/0266981 | A1 | * | 11/2006 | Asaka et al. | 252/500 |
| 2007/0179263 | A1 | | 8/2007 | Koh et al. | |

FOREIGN PATENT DOCUMENTS

| JP | 04-275078 A | 9/1992 |
|---|---|---|
| JP | 08-335726 A | 12/1996 |
| JP | 2004-349240 A | 12/2004 |

(Continued)

*Primary Examiner* — Randy Gulakowski
*Assistant Examiner* — Khanh Tuan Nguyen
(74) *Attorney, Agent, or Firm* — Sughrue Mion, PLLC

(57) ABSTRACT

An ion-conducting layer for an actuator element including (I) a fluorine-containing polymer having a functional group and (II) an ionic liquid. The functional group is selected from —OH, —COOH, —COOR, —CN, iodine atom, epoxy group and (meth)acryloyl group, and is contained in a side chain and/or at an end of a trunk chain of the fluorine-containing polymer. Also disclosed is an electrode layer including (I) the fluorine-containing polymer having a functional group, (II) an ionic liquid and (III) an electroconductive nanofiller. Also disclosed is an actuator element including the ion-conducting layer and at least two electrode layers formed on the surfaces of the ion-conducting layer and insulated from one another, in which flection or deformation can be caused by applying an electric potential between the electrode layers.

8 Claims, 6 Drawing Sheets

FOREIGN PATENT DOCUMENTS

| | | | |
|---|---|---|---|
| JP | 2005-176428 | * | 6/2005 |
| JP | 2005-224027 | * | 8/2005 |
| WO | 2004/036599 A1 | | 4/2004 |
| WO | WO 2004-059664 A1 | * | 7/2004 |
| WO | 2005/057772 A1 | | 6/2005 |
| WO | 2005/085181 A1 | | 9/2005 |

* cited by examiner

ACTUATOR ELEMENT

TECHNICAL FIELD

The present invention relates to an electrochemical actuator element driven by an electrochemical process such as an electrochemical reaction and charging and discharging of an electric double layer.

BACKGROUND ART

Demand for a small light-weight actuator having high flexibility is increasing in the fields of medical instruments, equipment for industrial use, personal robot, micromachine, and the like.

In the case of a small size actuator, actuators of electrostatic attraction type, piezoelectric type, ultrasonic wave type, shape memory alloy type and polymer expansion/contraction type, and electrochemical type actuators such as electron-conducting polymer actuator and ion-conducting polymer actuator using an electrochemical reaction are proposed.

In these actuators, in order to extend applications of small size actuators more, electrochemical polymer actuators which can be driven at low voltage, exhibits a quick response, has high flexibility, can easily realize a small size and a light weight, and can be operated with small electric power have been developed. These actuators are roughly classified into two types, i.e., one is an actuator making use of expansion/contraction by reduction/oxidation of an electron conducting polymer such as polypyrrole and polyaniline in an electrolyte (electron-conducting polymer actuator), and another one is an actuator comprising an ion-exchange membrane and a junction electrode and being capable of functioning as an actuator by applying an electric potential difference to the ion-exchange membrane being in a water-containing state to cause flection or deformation of the ion-exchange membrane (ion-conducting polymer actuator).

Among these actuators, electron-conducting polymer actuators have advantages that they can be operated at low voltage, a degree of expansion/contraction is large and a generated pressure is high, but a response speed is slow, and a preparation process of polypyrrole having most satisfactory performance is limited only to electrolytic polymerization. In addition, it is pointed out that they have a problem with durability for repeated use from theoretical point of view because response depends on doping and de-doping of ion resulting from a redox reaction.

In order to overcome these problems, an actuator having an electrode which is prepared by molding carbon nanotube into a paper form and makes use of an expansion/contraction phenomenon due to a change in interfacial stress resulting from charging and discharging of an electric double layer is proposed (cf. Science, Vol. 284, 1999, p. 1340). This actuator exhibits a quick response and has a long service life due to the principle based on charging and discharging of a double layer. Also it is known that a generated pressure is high. However its degree of expansion/contraction is small, and in its preparation process, a very complicated filtration operation taking a long period of time is necessary. In addition, this actuator has low mechanical strength and is operated only in an electrolytic solution.

On the other hand, any of conventional electron-conducting polymer actuators or ion-conducting polymer actuators has been used mainly in an aqueous solution of electrolyte because an electrolyte is necessary for operation thereof. Ion-conducting polymer actuators are used basically in water because sufficient ion conductivity is not exhibited unless an ion-exchange resin is in a state of being swelled by water. In order to use these actuators in air, it is necessary to prevent evaporation of water. For that purpose, a resin coating method is reported, but in this method, complete coating is difficult and a coating is broken even by generation of a small amount of gas due to an electrode reaction, and further the coating itself becomes a resistance to response deformation. Thus the method has not been put into practical use. Also organic solvents having a high boiling point such as propylene carbonate are used instead of water, but also in this case, there are similar problems, and in addition, there are problems that such solvents are not so high in ion conductivity as water and are inferior in responsivity.

Such being the case, since conventional actuators are driven only in limited environment, mainly in an electrolyte solution, application thereof is so limited. Therefore development of an actuator element driven in air is essential for putting a small size actuator into practical use in a wide range of applications.

For the purpose of operating actuators in air, there are examples of disposing an electron-conducting polymer at both sides of an ion-exchange resin or disposing an conductive polymer on a gel membrane containing an organic solvent having a high boiling point such as propylene carbonate to utilize expansion/contraction of electrodes disposed at both sides and to use as an actuator element. In these examples, there are problems with drying of a solvent and low ion conductivity like the case of ion-conducting polymer actuators, and substantial solutions have not been given.

In order to solve these problems, research for application is recently being advanced with respect to use of salts which are known as ionic liquids, are called normal temperature molten salts or simply molten salts, and show a molten state in a wide temperature range including normal temperature (room temperature). In the case of an ionic liquid, since a vapor pressure can be neglected, drying of a solvent by evaporation can be prevented.

For the purpose of operating electron-conducting polymer actuators in air, there are researches of an expansion/contraction phenomenon of a conductive polymer in an ionic liquid (cf. Science, Vol. 297, 2002, p. 983) and researches of a totally solid-state element using a complex comprising polypyrrole and an ionic liquid of polyvinylidene fluoride (cf. Electrochimica Acta, Vol. 48, 2003, p. 2355). However in these researches, too, theoretical problems as mentioned above which result from a conductive polymer, namely problems with slow response, preparation process and service life have not yet been solved.

In order to overcome these un-solved problems, JP2005-176428A proposes an actuator element which can be operated in air or in vacuo by using a gel of carbon nanotube and ionic liquid as a conductive expandable active layer and using, as a conducting layer, a layer comprising an ionic liquid and a fluorine-containing polymer such as a vinylidene fluoride/hexafluoropropylene copolymer, polyvinylidene fluoride or perfluorosulfonic acid (NAFION, trade mark of Du Pont).

However, in order to improve durability for repeated use of an actuator element, it is necessary to further enhance electrochemical stability and mechanical strength, and further, a resin having a high degree of expansion/contraction and generating a large pressure is demanded.

DISCLOSURE OF INVENTION

It is an object of the present invention to provide an actuator element which can be driven at low voltage, is operated stably in quick response in air and in vacuo, has high mechanical strength including flexibility and long-term durability for repeated use, can be produced by a very easy method, can easily realize a size reduction because of its simple structure and can be put into practical use in a wide range of applications.

Namely, the present invention relates to an ion-conducting layer for an actuator element comprising (I) a fluorine-containing polymer having functional group and (II) an ionic liquid, in which the fluorine-containing polymer (I) having functional group is a polymer having functional group selected from the group consisting of —OH, —COOH, —COOR, —CN, iodine atom, epoxy group and (meth)acryloyl group in a polymer side chain and/or at an end of a polymer trunk chain.

Also the present invention relates to an electrode layer for an actuator element comprising (I) a fluorine-containing polymer having functional group, (II) an ionic liquid and (III) an electroconductive nano-filler, in which the fluorine-containing polymer (I) having functional group is a polymer having functional group selected from the group consisting of —OH, —COOH, —COOR, —CN, iodine atom, epoxy group and (meth)acryloyl group in a polymer side chain and/or at an end of a polymer trunk chain.

Further, the present invention relates to an actuator element of a three-layer structure comprising the ion-conducting layer of the present invention and at least two electrode layers of the present invention which are formed on the surfaces of the ion conducting layer and are insulated from each other, in which flection or deformation can be caused by applying an electric potential difference to the electrode layers, and an actuator element of a five-layer structure comprising the ion-conducting layer of the present invention, at least two electrode layers of the present invention which are formed on the surfaces of the ion-conducting layer and are insulated from each other, and electroconductive layers formed on the surfaces of the electrode layers, in which flection or deformation can be caused by applying an electric potential difference to the electroconductive layers.

Further, the present invention relates to a composition for forming the ion-conducting layer for an actuator element comprising the above-mentioned fluorine-containing polymer (I) having functional group and ionic liquid (II), and a composition for forming an electrode layer for an actuator element comprising the above-mentioned fluorine-containing polymer (I) having functional group, ionic liquid (II) and electroconductive nano-filler (III).

Preferable example of the above-mentioned fluorine-containing polymer (I) having specific functional group is a fluorine-containing polymer (Ia) having functional group and represented by the formula (I):

(1)

in which the structural unit M is a structural unit derived from a fluorine-containing ethylenic monomer and represented by the formula (M):

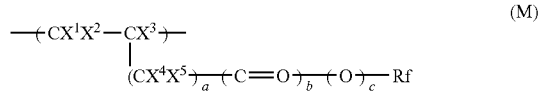(M)

wherein $X^1$ and $X^2$ are the same or different and each is H or F; $X^3$ is H, F, $CH_3$ or $CF_3$; $X^4$ and $X^5$ are the same or different and each is H, F or $CF_3$; Rf has 1 to 5 functional groups Y (Ys are the same or different and each is —OH, —COOH, —COOR, —CN, iodine atom, epoxy group or (meth)acryloyl group) and is a fluorine-containing alkyl group having 1 to 50 carbon atoms excluding carbon atoms contained in the functional group or a fluorine-containing alkyl group having ether bond and 2 to 100 carbon atoms excluding carbon atoms contained in the functional group; a is 0 or an integer of from 1 to 10; b and c are the same or different and each is 0 or 1, the structural unit A is a structural unit derived from a monomer copolymerizable with the fluorine-containing ethylenic monomer providing the structural unit represented by the formula (M), and the structural unit M and the structural unit A are contained in amounts of from 0.1 to 100% by mole and from 0 to 99.9% by mole, respectively.

The above-mentioned actuator elements can be produced by forming and laminating the electrode layer and the ion conducting layer by casting, coating, printing, extruding or injecting the composition comprising the fluorine-containing polymer (I) having functional group, the ionic liquid (II), and the electroconductive nano-filler (III) and the composition comprising the fluorine-containing polymer (I) having functional group and the ionic liquid (II).

BEST MODE FOR CARRYING OUT THE INVENTION

Figure 1:
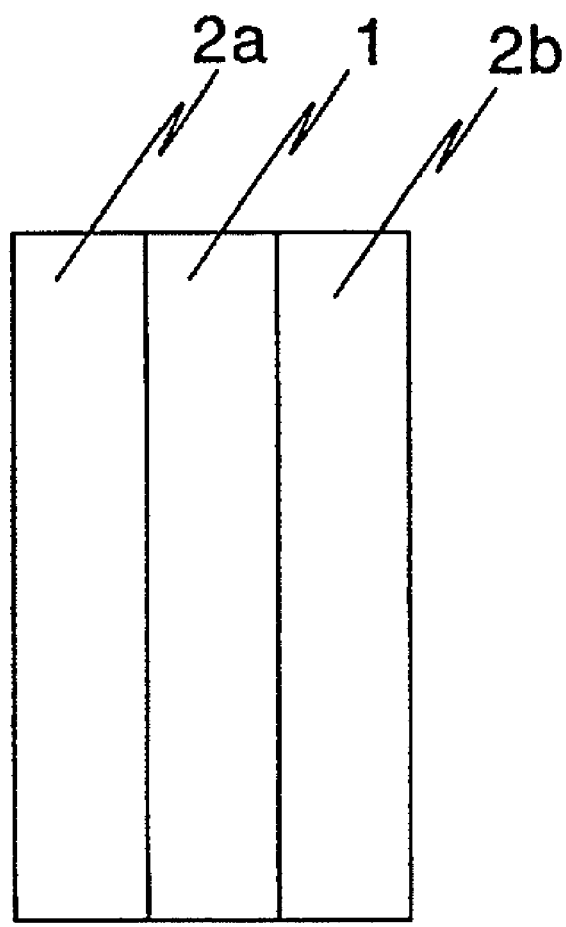
FIG. 1 A diagrammatic cross-sectional view showing a structure of an example of the actuator element (three-layer structure) of the present invention.

Firstly, the fluorine-containing polymer (I) having specific functional group and the ionic liquid (II) which are commonly used in the present invention are explained.

The first of the fluorine-containing polymer (I) having specific functional group which is usable in the present invention is a fluorine-containing polymer having functional group and represented by the formula (I):

(1)

in which the structural unit M is a structural unit derived from a fluorine-containing ethylenic monomer and represented by the formula (M):

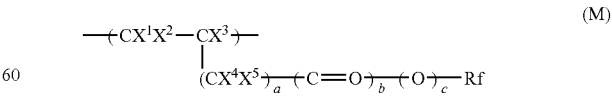(M)

wherein $X^1$ and $X^2$ are the same or different and each is H or F; $X^3$ is H, F, $CH_3$ or $CF_3$; $X^4$ and $X^5$ are the same or different and each is H, F or $CF_3$; Rf has 1 to 5 functional groups Y (Ys are the same or different and each is —OH, —COOH, —COOR, —CN, iodine atom, epoxy group or (meth)acryloyl group) and is a fluorine-containing alkyl group having 1 to 50 carbon atoms excluding carbon atoms contained in the functional group or a fluorine-containing alkyl group having ether bond and 2 to 100 carbon atoms excluding carbon atoms contained in the functional group; a is 0 or an integer of from 1 to 10; b and c are the same or different and each is 0 or 1, the structural unit A is a structural unit derived from a monomer copolymerizable with the fluorine-containing ethylenic monomer providing the structural unit represented by the formula (M),
and the structural unit M and the structural unit A are contained in amounts of from 0.1 to 100% by mole and from 0 to 99.9% by mole, respectively. As mentioned above, the fluorine-containing polymer (Ia) having functional group does not encompass perfluorosulfonic acid polymers.

In the present invention, the structural unit M of the fluorine-containing polymer (Ia) having functional group of the formula (1) is preferably a structural unit M1 derived from a fluorine-containing ethylenic monomer and represented by the formula (3):

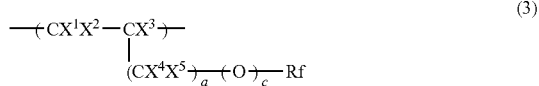

(3)

wherein $X^1$, $X^2$, $X^3$, $X^4$, $X^5$, Rf, a and c are as defined above.

A copolymer containing this structural unit M1 is preferable for not only enhancing ion conductivity and increasing a response speed and a driving width but also imparting performances such as controllability of elastic modulus and adhesion by improving compatibility of the fluorine-containing polymer (Ia) having functional group with the ionic liquid.

A polymer comprising this structural unit M1 is not limited especially to a copolymer, and a homopolymer consisting of the structural unit M1 is also preferable.

Further preferable example of the structural unit M1 is a structural unit M2 derived from a fluorine-containing ethylenic monomer and represented by the formula (4):

(4)

wherein Rf is as defined above.

This structural unit M2 is a structural unit derived from fluorine-containing allyl ether having at least one of the specific functional groups, and is preferable since not only compatibility with the ionic liquid is enhanced but also polymerizability is satisfactory, especially homopolymerizability and copolymerizability with other fluorine-containing ethylenic monomer are satisfactory.

Also another preferable example of the structural unit M1 is a structural unit M3 derived from a fluorine-containing ethylenic monomer and represented by the formula (5):

(5)

wherein $R_f$ is as defined above.

This structural unit M3 is a structural unit derived from fluorine-containing vinyl ether having at least one of the specific functional groups, and is preferable since compatibility with the ionic liquid can be enhanced and copolymerizability with other fluorine-containing ethylenic monomer is satisfactory.

In the fluorine-containing polymer (Ia) having functional group of the formula (1) which is used in the present invention, Rf contained in the structural units M, M1, M2 and M3 has, as mentioned above, 1 to 5 specific functional groups Y and is a fluorine-containing alkyl group having 1 to 50 carbon atoms excluding carbon atoms contained in the functional group or a fluorine-containing alkyl group having ether bond and 2 to 100 carbon atoms excluding carbon atoms contained in the functional group.

This functional group Y in the Rf is —OH, —COOH, —COOR, —CN, iodine atom, epoxy group or (meth)acryloyl group, and when a plurality of Ys are contained, they may be the same or different.

Rf from which the functional group Y is excluded is a fluorine-containing alkylene group having 1 to 49 carbon atoms or a fluorine-containing alkylene group having 2 to 99 carbon atoms and ether bond, and fluorine atom is bonded to the contained carbon atom. Rf is generally a fluorine-containing alkylene group or a fluorine-containing alkylene group having ether bond, in which fluorine atom and hydrogen atom or chlorine atom are bonded to the carbon atom.

Too large number of carbon atoms of the Rf group excluding the functional group Y is not preferable because there is a case where solubility of the fluorine-containing polymer (Ia) having functional group in the ionic liquid is lowered in the case of a fluorine-containing alkylene group. The number of carbon atoms of the fluorine-containing alkylene group is preferably from 1 to 20, more preferably from 1 to 10. The number of carbon atoms of the fluorine-containing alkylene group having ether bond is preferably from 2 to 30, more preferably from 2 to 20.

Preferable examples of Rf group excluding the functional group Y are:

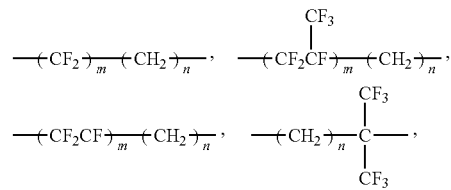

(m: from 1 to 10, n: from 0 to 5)

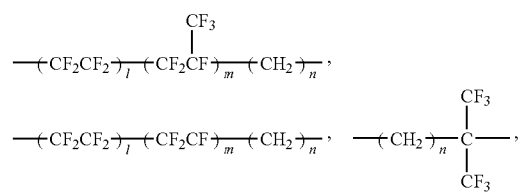

(l: from 1 to 10, m: from 1 to 10, n: from 0 to 5)

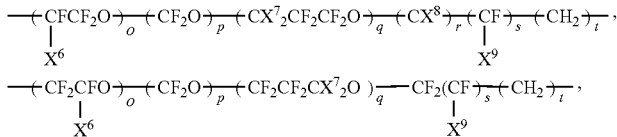

($X^6$ and $X^9$ are F or $CF_3$; $X^7$ and $X^8$ are H or F; o+p+q is from 1 to 30; r is 0 or 1; s and t are 0 or 1)
and the like.

As mentioned above, the structural unit M constituting the fluorine-containing polymer (Ia) having functional group of the present invention is preferably the structural unit M1, and the structural unit M1 is preferably the structural unit M2 and structural unit M3. Next, mentioned below are examples of the structural units M2 and M3.

Preferable examples of monomers giving the structural unit M2 are:
$CH_2$=$CFCF_2O[CF(CF_3)CF_2O]_nCF(CF_3)$—$(CF_2)_m$—Rf' (m is 0 or an integer of 1 to 10; n is 0 or an integer of 1 to 8),
$CH_2$=$CFCF_2O[CF(CF_3)CF_2O]_nCF(CF_3)$—$(CF_2)_m$—$(CH_2)_l$—Rf' (l is an integer of 1 to 4; m is 0 or an integer of 1 to 10; n is 0 or an integer of 1 to 8),
$CH_2$=$CFCF_2O(CF_2CF_2O)_n$—$(CF_2)_m$—Rf' (m is 0 or an integer of 1 to 8; n is 0 or an integer of 1 to 8),
$CH_2$=$CFCF_2O(CF_2CF_2O)_n$—$(CF_2)_m$—$(CH_2)_l$—Rf' (l is an integer of 1 to 4; m is 0 or an integer of 1 to 10; n is 0 or an integer of 1 to 8),
and the like, when a moiety having the specific functional group is represented by Rf'.

More specifically there are:
$CH_2$=$CFCF_2O[CF(CF_3)CF_2O]_nCF(CF_3)$—$(CF_2)_m$—I (n is 0 or an integer of 1 to 8; m is 0 or an integer of 1 to 10),
$CH_2$=$CFCF_2O[CF(CF_3)CF_2O]_nCF(CF_3)CO_2R$ (n is 0 or an integer of 1 to 8; R is hydrogen atom or a hydrocarbon group having 1 to 20 carbon atoms),
$CH_2$=$CFCF_2O[CF(CF_3)CF_2O]_nCF(CF_3)CH_2OH$ (n is 0 or an integer of 1 to 8),
$CH_2$=$CFCF_2O[CF(CF_3)CF_2O]_nCF(CF_3)CN$ (n is 0 or an integer of 1 to 8),

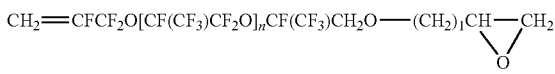

(n is 0 or an integer of 1 to 8; l is 0 or an integer of 1 to 4),
$CH_2$=$CFCF_2O(CF_2CF_2O)_n$—$(CF_2)_m$—I (n is 0 or an integer of 1 to 8; m is 0 or an integer of 1 to 10),
$CH_2$=$CFCF_2O(CF_2CF_2O)_n$—$(CF_2)_m$—$CO_2R$ (n is 0 or an integer of 1 to 8; m is 0 or an integer of 1 to 10; R is hydrogen atom or a hydrocarbon group having 1 to 20 carbon atoms),
$CH_2$=$CFCF_2O(CF_2CF_2O)_n$—$(CF_2)_m$—$CH_2OH$ (n is 0 or an integer of 1 to 8; m is 0 or an integer of 1 to 10),
$CH_2$=$CFCF_2O(CF_2CF_2O)_n$—$(CF_2)_m$—CN (n is 0 or an integer of 1 to 8; m is 0 or an integer of 1 to 10),

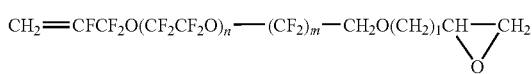

(n is 0 or an integer of 1 to 8; m is 0 or an integer of 1 to 10; l is 0 or an integer of 1 to 4)
and the like.

Preferable examples of monomers giving the structural unit M3 are:
$CF_2$=$CF[OCF_2CF(CF_3)]_n$—$(CF_2)_m$—Rf' (n is 0 or an integer of 1 to 8; m is 0 or an integer of 1 to 10),
$CF_2$=$CF[OCF_2CF(CF_3)]_n$—$(CF_2)_m$—$(CH_2)_l$—Rf' (l is an integer of 1 to 4; n is 0 or an integer of 1 to 8; m is 0 or an integer of 1 to 10),
$CF_2$=$CF(OCF_2CF_2)_nO(CF_2)_m$—Rf' (n is 0 or an integer of 1 to 8; m is 0 or an integer of 1 to 10),
$CF_2$=$CF(OCF_2CF_2)_nO(CF_2)_m$—$(CH_2)_l$—Rf' (l is an integer of 1 to 4; n is 0 or an integer of 1 to 8; m is 0 or an integer of 1 to 10),
and the like, when a moiety having the specific functional group is represented by Rf'.

More specifically there are:
$CF_2$=$CF[OCF_2CF(CF_3)]_n$—$(CF_2)_m$—I (n is 0 or an integer of 1 to 8; m is 0 or an integer of 1 to 10),
$CF_2$=$CF[OCF_2CF(CF_3)]_n$—$(CF_2)_m$—$CO_2R$ (n is 0 or an integer of 1 to 8; m is 0 or an integer of 1 to 10; R is H or a hydrocarbon group having 1 to 20 carbon atoms),
$CF_2$=$CF[OCF_2CF(CF_3)]_n$—$(CF_2)_m$—CN (n is 0 or an integer of 1 to 8; m is 0 or an integer of 1 to 10),
$CF_2$=$CF[OCF_2CF(CF_3)]_n$—$(CF_2)_m$—$CH_2OH$ (n is 0 or an integer of 1 to 8; m is 0 or an integer of 1 to 10),

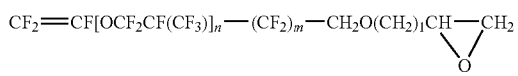

(n is 0 or an integer of 1 to 8; m is 0 or an integer of 1 to 10; l is 0 or an integer of 1 to 4),
$CF_2$=$CF(OCF_2CF_2)_nO(CF_2)_m$—I (n is 0 or an integer of 1 to 8; m is 0 or an integer of 1 to 10),
$CF_2$=$CF(OCF_2CF_2)_nO(CF_2)_m$—$CO_2R$ (n is 0 or an integer of 1 to 8; m is 0 or an integer of 1 to 10; R is hydrogen atom or an alkyl group which may be replaced by halogen atom),
$CF_2$=$CF(OCF_2CF_2)_nO(CF_2)_m$—CN (n is 0 or an integer of 1 to 8; m is 0 or an integer of 1 to 10),
$CF_2$=$CF(OCF_2CF_2)_nO(CF_2)_m$—$CH_2OH$ (n is 0 or an integer of 1 to 8; m is 0 or an integer of 1 to 10),

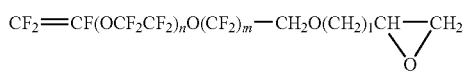

(n is 0 or an integer of 1 to 8; m is 0 or an integer of 1 to 10; l is 0 or an integer of 1 to 4),
and the like.

Preferable examples of monomers constituting the structural unit M of the fluorine-containing polymer (I) having functional group other than the structural units M2 and M3 are:

$CH_2=CF(Rf^B)_n-Rf'$ ($Rf^B$ is $CF_2$, $CH_2$, $CF_2CFCl$, $CF_2CF(CF_3)$ or $CF_2CH_2$; n is 0 or an integer of 1 to 20), $CH_2=CF(Rf^B)_n-(CH_2)_l-Rf'$ ($Rf^B$ is $CF_2$, $CH_2$, $CF_2CFCl$, $CF_2CF(CF_3)$ or $CF_2CH_2$; l is an integer of 1 to 4; n is 0 or an integer of 1 to 20), $CF_2=CF(Rf^B)_n-Rf'$ ($Rf^B$ is $CF_2$, $CH_2$, $CF_2CFCl$, $CF_2CF(CF_3)$ or $CF_2CH_2$; n is 0 or an integer of 1 to 20), $CF_2=CF(Rf^B)_n-(CH_2)_l-Rf'$ ($Rf^B$ is $CF_2$, $CH_2$, $CF_2CFCl$, $CF_2CF(CF_3)$ or $CF_2CH_2$; l is an integer of 1 to 4; n is 0 or an integer of 1 to 20), $CH_2=CH(Rf^B)_n-Rf'$ ($Rf^B$ is $CF_2$, $CH_2$, $CF_2CFCl$, $CF_2CF(CF_3)$ or $CF_2CH_2$; n is 0 or an integer of 1 to 20), $CH_2=CH(Rf^B)_n-(CH_2)_l-Rf'$ ($Rf^B$ is $CF_2$, $CH_2$, $CF_2CFCl$, $CF_2CF(CF_3)$ or $CF_2CH_2$; l is an integer of 1 to 4; n is 0 or an integer of 1 to 20), $CH_2=CF(CF_2)_nO[CF(CF_3)CF_2O]_mCF(CF_3)-(CF_2)_p-Rf'$ (n is 0 or an integer of 1 to 10; m is 0 or an integer of 1 to 8; p is 0 or an integer of 1 to 10), $CH_2=CF(CF_2)_nO[CF(CF_3)CF_2O]_mCF(CF_3)-(CF_2)_p-(CH_2)_l-Rf'$ (l is an integer of 1 to 4; n is 0 or an integer of 1 to 10; m is 0 or an integer of 1 to 8; p is 0 or an integer of 1 to 10), $CF_2=CF(CF_2)_nO[CF(CF_3)CF_2O]_mCF(CF_3)-(CF_2)_p-Rf'$ (n is 0 or an integer of 1 to 10; m is 0 or an integer of 1 to 8; p is 0 or an integer of 1 to 10), $CF_2=CF(CF_2)_nO[CF(CF_3)CF_2O]_mCF(CF_3)-(CF_2)_p-(CH_2)_l-Rf'$ (l is an integer of 1 to 4; n is 0 or an integer of 1 to 10; m is 0 or an integer of 1 to 8; p is 0 or an integer of 1 to 10), $CH_2=CH(CF_2)_nO[CF(CF_3)CF_2O]_mCF(CF_3)-(CF_2)_p-Rf'$ (n is 0 or an integer of 1 to 10; m is 0 or an integer of 1 to 8; p is 0 or an integer of 1 to 10), $CH_2=CH(CF_2)_nO[CF(CF_3)CF_2O]_mCF(CF_3)-(CF_2)_p-(CH_2)_l-Rf'$ (l is an integer of 1 to 4; n is 0 or an integer of 1 to 10; m is 0 or an integer of 1 to 8; p is 0 or an integer of 1 to 10), $CH_2=CF(CF_2)_nO(CF_2CF_2O)_m(CF_2)_p-Rf'$ (n is 0 or an integer of 1 to 10; m is 0 or an integer of 1 to 8; p is 0 or an integer of 1 to 10), $CH_2=CF(CF_2)_nO(CF_2CF_2O)_m(CF_2)_p-(CH_2)_l-Rf'$ (l is an integer of 1 to 4; n is 0 or an integer of 1 to 10; m is 0 or an integer of 1 to 8; p is 0 or an integer of 1 to 10), $CF_2=CF(CF_2)_nO(CF_2CF_2O)_m(CF_2)_p-Rf'$ (n is 0 or an integer of 1 to 10; m is 0 or an integer of 1 to 8; p is 0 or an integer of 1 to 10), $CF_2=CF(CF_2)_nO(CF_2CF_2O)_m(CF_2)_p-(CH_2)_l-Rf'$ (l is an integer of 1 to 4; n is 0 or an integer of 1 to 10; m is 0 or an integer of 1 to 8; p is 0 or an integer of 1 to 10), $CH_2=CH(CF_2)_nO(CF_2CF_2O)_m(CF_2)_p-Rf'$ (n is 0 or an integer of 1 to 10; m is 0 or an integer of 1 to 8; p is 0 or an integer of 1 to 10), $CH_2=CH(CF_2)_nO(CF_2CF_2O)_m(CF_2)_p-(CH_2)_l-Rf'$ (l is an integer of 1 to 4; n is 0 or an integer of 1 to 10; m is 0 or an integer of 1 to 8; p is 0 or an integer of 1 to 10), $CH_2=CF-C_6X_4-Rf'$ (X is H or F), $CH_2=CF-C_6X_4-(CH_2)_n-Rf'$ (X is H or F; n is an integer of 1 to 10), $CF_2=CF-C_6X_4-Rf'$ (X is H or F), $CF_2=CF-C_6X_4-(CH_2)_n-Rf'$ (X is H or F; n is an integer of 1 to 10), $CH_2=CH-C_6X_4-Rf'$ (X is H or F), $CH_2=CH-C_6X_4-(CH_2)_n-Rf'$ (X is H or F; n is an integer of 1 to 10), $CH_2=CX-CO_2-(CH_2)_l-(CF_2)_n-(CH_2)_m-Rf'$ (X is F or $CF_3$; l is an integer of 1 to 4; n is 0 or an integer of 1 to 10; m is 0 or an integer of 1 to 4), and the like, when a moiety having the specific functional group is represented by Rf'.

More specifically there are:

$CH_2=CF(CF_2)_n-I$ (n is 0 or an integer of 1 to 20), $CH_2=CF(CF_2)_n-CO_2R$ (n is 0 or an integer of 1 to 20; R is H or a hydrocarbon group having 1 to 20 carbon atoms), $CH_2=CF(CF_2)_n-CN$ (n is 0 or an integer of 1 to 20), $CH_2=CF(CF_2)_n-CH_2OH$ (n is 0 or an integer of 1 to 20),

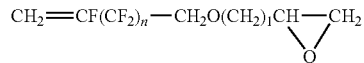

(n is 0 or an integer of 1 to 20; l is 0 or an integer of 1 to 4), $CH_2=CF(CF_2CFCl)_n-(CF_2)_m-I$ (n is an integer of 1 to 10; m is 0 or an integer of 1 to 10), $CH_2=CF(CF_2CFCl)_n-(CF_2)_m-CO_2R$ (n is an integer of 1 to 10; m is 0 or an integer of 1 to 10; R is H or a hydrocarbon group having 1 to 20 carbon atoms), $CH_2=CF(CF_2CFCl)_n-(CF_2)_m-CN$ (n is an integer of 1 to 10; m is 0 or an integer of 1 to 10), $CH_2=CF(CF_2CFCl)_n-(CF_2)_m-CH_2OH$ (n is an integer of 1 to 10; m is 0 or an integer of 1 to 10),

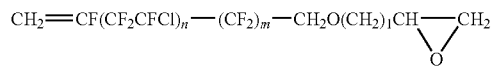

(n is an integer of 1 to 10; m is 0 or an integer of 1 to 10; l is 0 or an integer of 1 to 4), $CH_2=CF(CH_2CF_2)_n-(CF_2)_m-I$ (n is an integer of 1 to 10; m is 0 or an integer of 1 to 10), $CH_2=CF(CH_2CF_2)_n-(CF_2)_m-CO_2R$ (n is an integer of 1 to 10; m is 0 or an integer of 1 to 10; R is H or a hydrocarbon group having 1 to 20 carbon atoms), $CH_2=CF(CH_2CF_2)_n-(CF_2)_m-CN$ (n is an integer of 1 to 10; m is 0 or an integer of 1 to 10), $CH_2=CF(CH_2CF_2)_n-(CF_2)_m-CH_2OH$ (n is an integer of 1 to 10; m is 0 or an integer of 1 to 10),

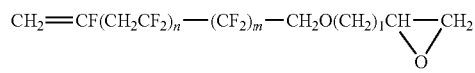

(n is an integer of 1 to 10; m is 0 or an integer of 1 to 10; l is 0 or an integer of 1 to 4), $CF_2=CF(CF_2)_n-I$ (n is 0 or an integer of 1 to 20), $CF_2=CF(CF_2)_n-CO_2R$ (n is 0 or an integer of 1 to 20; R is H or a hydrocarbon group having 1 to 20 carbon atoms), $CF_2=CF(CF_2)_n-CN$ (n is 0 or an integer of 1 to 20), $CF_2=CF(CF_2)_n-CH_2OH$ (n is 0 or an integer of 1 to 20),

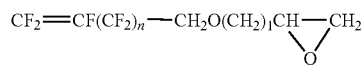

(n is 0 or an integer of 1 to 20; l is 0 or an integer of 1 to 4), $CF_2=CF(CF_2CFCl)_n-(CF_2)_m-I$ (n is an integer of 1 to 10; m is 0 or an integer of 1 to 10), $CF_2=CF(CF_2CFCl)_n-(CF_2)_m-CO_2R$ (n is an integer of 1 to 10; m is 0 or an integer of 1 to 10; R is H or a hydrocarbon group having 1 to 20 carbon atoms), $CF_2=CF(CF_2CFCl)_n-(CF_2)_m-CN$ (n is an integer of 1 to 10; m is 0 or an integer of 1 to 10), $CF_2\!\!=\!\!CF(CF_2CFCl)_n\text{-}(CF_2)_m\!\!-\!\!CH_2OH$ (n is an integer of 1 to 10; m is 0 or an integer of 1 to 10), $$CF_2\!\!=\!\!CF(CF_2CFCl)_n\!\!-\!\!(CF_2)_m\!\!-\!\!CH_2O(CH_2)_l\underset{\underset{O}{\diagdown\diagup}}{CH}\!\!-\!\!CH_2$$

(n is an integer of 1 to 10; m is 0 or an integer of 1 to 10; l is 0 or an integer of 1 to 4), $CF_2\!\!=\!\!CF(CH_2CF_2)_n\!\!-\!\!(CF_2)_m\!\!-\!\!I$ (n is an integer of 1 to 10; m is 0 or an integer of 1 to 10), $CF_2\!\!=\!\!CF(CH_2CF_2)_n\!\!-\!\!(CF_2)_m\!\!-\!\!CO_2R$ (n is an integer of 1 to 10; m is 0 or an integer of 1 to 10; R is H or a hydrocarbon group having 1 to 20 carbon atoms), $CF_2\!\!=\!\!CF(CH_2CF_2)_n\!\!-\!\!(CF_2)_m\!\!-\!\!CN$ (n is an integer of 1 to 10; m is 0 or an integer of 1 to 10), $CF_2\!\!=\!\!CF(CH_2CF_2)_n\!\!-\!\!(CF_2)_m\!\!-\!\!CH_2OH$ (n is an integer of 1 to 10; m is 0 or an integer of 1 to 10), $$CF_2\!\!=\!\!CF(CH_2CF_2)_n\!\!-\!\!(CF_2)_m\!\!-\!\!CH_2O(CH_2)_l\underset{\underset{O}{\diagdown\diagup}}{CH}\!\!-\!\!CH_2$$

(n is an integer of 1 to 10; m is 0 or an integer of 1 to 10; l is 0 or an integer of 1 to 4), $CH_2\!\!=\!\!CH(CF_2)_n\!\!-\!\!I$ (n is 0 or an integer of 1 to 20), $CH_2\!\!=\!\!CH(CF_2)_n\!\!-\!\!CO_2R$ (n is 0 or an integer of 1 to 20; R is H or a hydrocarbon group having 1 to 20 carbon atoms), $CH_2\!\!=\!\!CH(CF_2)_n\!\!-\!\!CN$ (n is 0 or an integer of 1 to 20), $CH_2\!\!=\!\!CH(CF_2)_n\!\!-\!\!CH_2OH$ (n is 0 or an integer of 1 to 20), $$CH_2\!\!=\!\!CH(CF_2)_n\!\!-\!\!CH_2O(CH_2)_l\underset{\underset{O}{\diagdown\diagup}}{CH}\!\!-\!\!CH_2$$

(n is 0 or an integer of 1 to 20; l is 0 or an integer of 1 to 4), $CH_2\!\!=\!\!CH(CFClCF_2)_n\!\!-\!\!(CF_2)_m\!\!-\!\!I$ (n is an integer of 1 to 10; m is 0 or an integer of 1 to 10), $CH_2\!\!=\!\!CH(CFClCF_2)_n\!\!-\!\!(CF_2)_m\!\!-\!\!CO_2R$ (n is an integer of 1 to 10; m is 0 or an integer of 1 to 10; R is H or a hydrocarbon group having 1 to 20 carbon atoms), $CH_2\!\!=\!\!CH(CFClCF_2)_n\!\!-\!\!(CF_2)_m\!\!-\!\!CN$ (n is an integer of 1 to 10; m is 0 or an integer of 1 to 10), $CH_2\!\!=\!\!CH(CFClCF_2)_n\!\!-\!\!(CF_2)_m\!\!-\!\!CH_2OH$ (n is an integer of 1 to 10; m is 0 or an integer of 1 to 10), $$CH_2\!\!=\!\!CH(CFClCF_2)_n\!\!-\!\!(CF_2)_m\!\!-\!\!CH_2O(CH_2)_l\underset{\underset{O}{\diagdown\diagup}}{CH}\!\!-\!\!CH_2$$

(n is an integer of 1 to 10; m is 0 or an integer of 1 to 10; l is 0 or an integer of 1 to 4), $CH_2\!\!=\!\!CH(CF_2CH_2)_n\!\!-\!\!(CF_2)_m\!\!-\!\!I$ (n is an integer of 1 to 10; m is 0 or an integer of 1 to 10), $CH_2\!\!=\!\!CH(CF_2CH_2)_n\!\!-\!\!(CF_2)_m\!\!-\!\!CO_2R$ (n is an integer of 1 to 10; m is 0 or an integer of 1 to 10; R is H or a hydrocarbon group having 1 to 20 carbon atoms), $CH_2\!\!=\!\!CH(CF_2CH_2)_n\!\!-\!\!(CF_2)_m\!\!-\!\!CN$ (n is an integer of 1 to 10; m is 0 or an integer of 1 to 10), $CH_2\!\!=\!\!CH(CF_2CH_2)_n\!\!-\!\!(CF_2)_m\!\!-\!\!CH_2OH$ (n is an integer of 1 to 10; m is 0 or an integer of 1 to 10), $$CH_2\!\!=\!\!CH(CF_2CH_2)_n\!\!-\!\!(CF_2)_m\!\!-\!\!CH_2O(CH_2)_l\underset{\underset{O}{\diagdown\diagup}}{CH}\!\!-\!\!CH_2$$

(n is an integer of 1 to 10; m is 0 or an integer of 1 to 10; l is 0 or an integer of 1 to 4), $CH_2\!\!=\!\!CF\!\!-\!\!C_6X_4\!\!-\!\!I$ (X is H or F), $CH_2\!\!=\!\!CF\!\!-\!\!C_6X_4\!\!-\!\!CO_2R$ (X is H or F; R is hydrogen atom or a hydrocarbon group having 1 to 20 carbon atoms), $CH_2\!\!=\!\!CF\!\!-\!\!C_6X_4\!\!-\!\!CN$ (X is H or F), $CH_2\!\!=\!\!CF\!\!-\!\!C_6X_4\!\!-\!\!OH$ (X is H or F), $CH_2\!\!=\!\!CF\!\!-\!\!C_6X_4\!\!-\!\!CY_2OH$ (X is H or F; Y is H or $CF_3$), $$CH_2\!\!=\!\!CF\!\!-\!\!C_6X_4\!\!-\!\!CY_2O(CH_2)_l\underset{\underset{O}{\diagdown\diagup}}{CH}\!\!-\!\!CH_2$$

(X is H or F; Y is H or $CF_3$; l is 0 or an integer of 1 to 8), $CH_2\!\!=\!\!CF\!\!-\!\!O\!\!-\!\!C_6X_5$ (X is H or F), $CH_2\!\!=\!\!CF\!\!-\!\!O\!\!-\!\!C_6X_4\!\!-\!\!I$ (X is H or F), $CH_2\!\!=\!\!CF\!\!-\!\!O\!\!-\!\!C_6X_4\!\!-\!\!CO_2R$ (X is H or F; R is hydrogen atom or a hydrocarbon group having 1 to 20 carbon atoms), $CH_2\!\!=\!\!CF\!\!-\!\!O\!\!-\!\!C_6X_4\!\!-\!\!CN$ (X is H or F), $CH_2\!\!=\!\!CF\!\!-\!\!O\!\!-\!\!C_6X_4\!\!-\!\!OH$ (X is H or F), $CH_2\!\!=\!\!CF\!\!-\!\!O\!\!-\!\!C_6X_4\!\!-\!\!CY_2OH$ (X is H or F; Y is H or $CF_3$), $$CH_2\!\!=\!\!CF\!\!-\!\!O\!\!-\!\!C_6X_4\!\!-\!\!CY_2O(CH_2)_l\underset{\underset{O}{\diagdown\diagup}}{CH}\!\!-\!\!CH_2$$

(X is H or F; Y is H or $CF_3$; l is 0 or an integer of 1 to 8), $CF_2\!\!=\!\!CF\!\!-\!\!C_6X_5$ (X is H or F), $CF_2\!\!=\!\!CF\!\!-\!\!C_6X_4\!\!-\!\!I$ (X is H or F), $CF_2\!\!=\!\!CF\!\!-\!\!C_6X_4\!\!-\!\!CO_2R$ (X is H or F; R is hydrogen atom or a hydrocarbon group having 1 to 20 carbon atoms), $CF_2\!\!=\!\!CF\!\!-\!\!C_6X_4\!\!-\!\!CN$ (X is H or F), $CF_2\!\!=\!\!CF\!\!-\!\!C_6X_4\!\!-\!\!OH$ (X is H or F), $CF_2\!\!=\!\!CF\!\!-\!\!C_6X_4\!\!-\!\!CY_2OH$ (X is H or F; Y is H or $CF_3$), $$CF_2\!\!=\!\!CF\!\!-\!\!C_6X_4\!\!-\!\!CY_2O(CH_2)_l\underset{\underset{O}{\diagdown\diagup}}{CH}\!\!-\!\!CH_2$$

(X is H or F; Y is H or $CF_3$; l is 0 or an integer of 1 to 8), $CF_2\!\!=\!\!CF\!\!-\!\!O\!\!-\!\!C_6X_5$ (X is H or F), $CF_2\!\!=\!\!CF\!\!-\!\!O\!\!-\!\!C_6X_4\!\!-\!\!I$ (X is H or F), $CF_2\!\!=\!\!CF\!\!-\!\!O\!\!-\!\!C_6X_4\!\!-\!\!CO_2R$ (X is H or F; R is hydrogen atom or a hydrocarbon group having 1 to 20 carbon atoms), $CF_2\!\!=\!\!CF\!\!-\!\!O\!\!-\!\!C_6X_4\!\!-\!\!CN$ (X is H or F), $CF_2\!\!=\!\!CF\!\!-\!\!O\!\!-\!\!C_6X_4\!\!-\!\!OH$ (X is H or F), $$CF_2\!\!=\!\!CF\!\!-\!\!O\!\!-\!\!C_6X_4\!\!-\!\!O(CH_2)_l\underset{\underset{O}{\diagdown\diagup}}{CH}\!\!-\!\!CH_2$$

(X is H or F; l is 0 or an integer of 1 to 8), $CF_2\!\!=\!\!CF\!\!-\!\!O\!\!-\!\!C_6X_4\!\!-\!\!CY_2OH$ (X is H or F; Y is H or $CF_3$), $$CF_2\!\!=\!\!CF\!\!-\!\!O\!\!-\!\!C_6X_4\!\!-\!\!CY_2O(CH_2)_l\underset{\underset{O}{\diagdown\diagup}}{CH}\!\!-\!\!CH_2$$

(X is H or F; Y is H or $CF_3$; l is 0 or an integer of 1 to 8),
$CH_2=CH-C_6X_5$ (X is H or F),
$CH_2=CH-C_6X_4-I$ (X is H or F),
$CH_2=CH-C_6X_4-CO_2R$ (X is H or F; R is hydrogen atom or a hydrocarbon group having 1 to 20 carbon atoms),
$CH_2=CH-C_6X_4-CN$ (X is H or F),
$CH_2=CH-C_6X_4-OH$ (X is H or F),

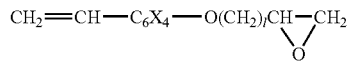

(X is H or F; l is 0 or an integer of 1 to 8),
$CH_2=CH-C_6X_4-CY^2OH$ (X is H or F; Y is H or $CF_3$),

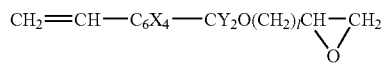

(X is H or F; Y is H or $CF_3$; l is 0 or an integer of 1 to 8),
$CH_2=CH-O-C_6X_5$ (X is H or F),
$CH_2=CH-O-C_6X_4-I$ (X is H or F),
$CH_2=CH-O-C_6X_4-CO_2R$ (X is H or F; R is hydrogen atom or a hydrocarbon group having 1 to 20 carbon atoms),
$CH_2=CH-O-C_6X_4-CN$ (X is H or F),
$CH_2=CH-O-C_6X_4-OH$ (X is H or F),

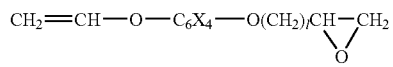

(X is H or F; l is 0 or an integer of 1 to 8),
$CH_2=CH-O-C_6X_4-CY_2OH$ (X is H or F; Y is H or $CF_3$),

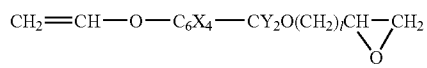

(X is H or F; Y is H or $CF_3$; l is 0 or an integer of 1 to 8),
$CH_2=CF-CO_2-(CH_2)_l-(CF_2)_n-(CH_2)_m-I$ (l is an integer of 1 to 4; n is 0 or an integer of 1 to 10; m is 0 or an integer of 1 to 4),
$CH_2=CF-CO_2-(CH_2)_l-(CF_2)_n-(CH_2)_m-CO_2R$ (l is an integer of 1 to 4; n is 0 or an integer of 1 to 10; m is 0 or an integer of 1 to 4; R is hydrogen atom or a hydrocarbon group having 1 to 20 carbon atoms),
$CH_2=CF-CO_2-(CH_2)_l-(CF_2)_n-(CH_2)_m-CN$ (l is an integer of 1 to 4; n is 0 or an integer of 1 to 10; m is 0 or an integer of 1 to 4),
$CH_2=CF-CO_2-(CH_2)_l-(CF_2)_n-(CH_2)_m-OH$ (l is an integer of 1 to 4; n is 0 or an integer of 1 to 10; m is 0 or an integer of 1 to 4),

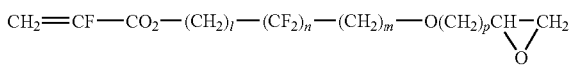

(l is an integer of 1 to 4; n is 0 or an integer of 1 to 10; m is 0 or an integer of 1 to 4; p is 0 or an integer of 1 to 4),
$CH_2=C(CF_3)-CO_2-(CH_2)_l-(CF_2)_n-(CH_2)_m-I$ (l is an integer of 1 to 4; n is 0 or an integer of 1 to 10; m is 0 or an integer of 1 to 4),
$CH_2=C(CF_3)-CO_2-(CH_2)_l-(CF_2)_n-(CH_2)_m-CO_2R$ (l is an integer of 1 to 4; n is 0 or an integer of 1 to 10; m is 0 or an integer of 1 to 4; R is hydrogen atom or a hydrocarbon group having 1 to 20 carbon atoms),
$CH_2=C(CF_3)-CO_2-(CH_2)_l-(CF_2)_n-(CH_2)_m-CN$ (l is an integer of 1 to 4; n is 0 or an integer of 1 to 10; m is 0 or an integer of 1 to 4),
$CH_2=C(CF_3)-CO_2-(CH_2)_l-(CF_2)_n-(CH_2)_m-OH$ (l is an integer of 1 to 4; n is 0 or an integer of 1 to 10; m is 0 or an integer of 1 to 4),

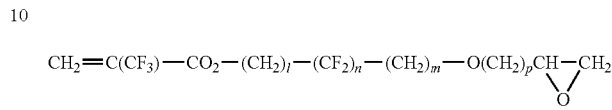

(l is an integer of 1 to 4; n is 0 or an integer of 1 to 10; m is 0 or an integer of 1 to 4; p is 0 or an integer of 1 to 4) and the like.

In the fluorine-containing polymer (Ia) having functional group of the formula (1), when Y contained in the structural units M, M1, M2 and M3 is a (meth)acryloyl group $Y^1$, its end is an ethylenic carbon-carbon double bond, and the polymer can be used in the form of a fluorine-containing prepolymer (IA).

The carbon-carbon double bond in $Y^1$ has ability of causing radical polymerization and cation polymerization and can give a cured (crosslinked) article. Specifically a polymerization reaction and a cyclization reaction occurs between the molecules of the fluorine-containing prepolymer (IA) or between the fluorine-containing prepolymer (IA) and the curing (crosslinking) agent to be added as case demands by contact with a radical or a cation, and thus a cured (crosslinked) article can be provided.

The first of preferable $Y^1$ is:

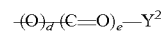

wherein $Y^2$ is an alkenyl group or fluorine-containing alkenyl group having 2 to 5 carbon atoms and an ethylenic carbon-carbon double bond at its end; d and e are the same or different and each is 0 or 1.

Preferable $Y^2$ is:

$-CX^{30}=CX^{31}X^{32}$ wherein $X^{30}$ is H, F, $CH_3$ or $CF_3$; $X^{31}$ and $X^{32}$ are the same or different and each is H or F, and this group is preferable since curing reactivity by contact with a radical or a cation is high.

Examples of preferable $Y^2$ are:

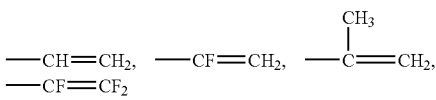

and the like.

The second of preferable $Y^1$ is:

wherein $X^{30}$ is H, F, $CH_3$ or $CF_3$; $X^{31}$ and $X^{32}$ are the same or different and each is H or F, and this group is preferable since curing reactivity especially by contact with a radical is high and a cured article can be easily obtained by photo-curing.

Examples of the second of preferable $Y^1$ are:

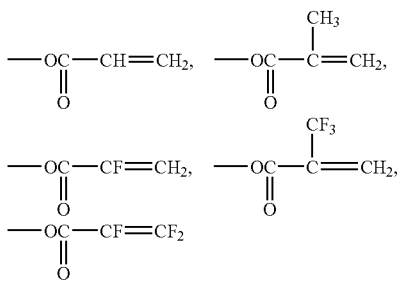

and the like.

Examples of other preferable $Y^1$ are:

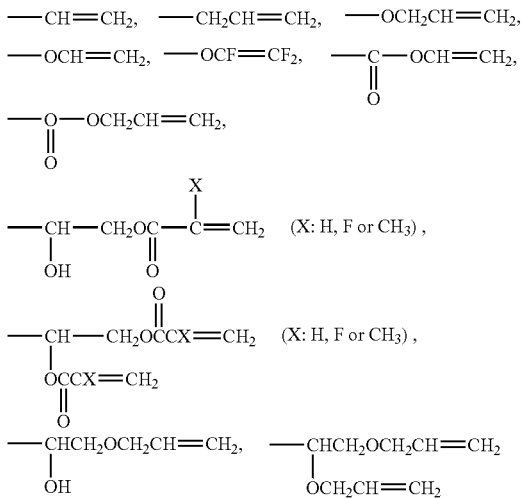

and the like.

Among the $Y^1$, those which have the structure of —O(C=O)CH=CH$_2$, —O(C=O)C(CH$_3$)=CH$_2$, —O(C=O)CF=CH$_2$ or —O(C=O)C(CF$_3$)=CH$_2$ are preferable because curing (crosslinking) reactivity is particularly high and a cured article can be obtained efficiently.

The (meth)acryloyl group $Y^1$ may be introduced to an end of the polymer trunk chain.

In the fluorine-containing polymer (Ia) having functional group which is used in the present invention, the structural unit A is an optional component. The structural unit A is not limited particularly as far as it is a structural unit derived from a monomer copolymerizable with the structural units M, M1, M2 and M3. The structural unit A may be optionally selected depending on required characteristics of the intended fluorine-containing polymer (Ia) having functional group.

Examples of the structural unit A are, for instance, as follows.

(i) Structural Units Derived from Fluorine-Containing Ethylenic Monomers Having Functional Group but not the Specific Functional Group Y These structural units are preferable since adhesion to a substrate and solubility in a solvent, especially solubility in general-purpose solvents can be imparted while maintaining compatibility of the fluorine-containing polymer (Ia) having functional group and a composition obtained therefrom with the ionic liquid, and in addition, functions such as crosslinkability can be imparted.

Preferable structural unit of the fluorine-containing ethylenic monomer having functional group is a structural unit represented by the formula (6):

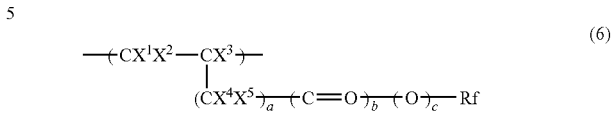

wherein $X^1$ and $X^2$ are the same or different and each is H or F; $X^3$ is H, F, CH$_3$ or CF$_3$; $X^4$ and $X^5$ are the same or different and each is H, F or CF$_3$; Rf has 1 to 5 functional groups $Z^1$ ($Z^1$s are the same or different and each is a functional group other than —OH, —COOH, —COOR, —CN, iodine atom, epoxy group, (meth)acryloyl group and a sulfonyl group) and is a fluorine-containing alkyl group having 1 to 50 carbon atoms excluding carbon atoms contained in the functional group or a fluorine-containing alkyl group having ether bond and 2 to 100 carbon atoms excluding carbon atoms contained in the functional group; a is 0 or an integer of from 1 to 10; b and c are the same or different and each is 0 or 1. Examples of $Z^1$ are an amino group, an amine derivative group, an alkoxyl group, an acyloxyl group, a formyl group, an acyl group, a thiol group, a phosphoric acid group, a phosphoric ester group, a phenyl group, a silyl group and a siloxy group.

Particularly preferred is a structural unit derived from:

wherein $Rf^{13}$ is a fluorine-containing alkylene group having 1 to 40 carbon atoms or a fluorine-containing alkylene group having 2 to 100 carbon atoms and ether bond; $Z^1$ is as defined above.

More specifically there are preferably exemplified structural units derived from fluorine-containing ethylenic monomers such as:

$CH_2=CFCF_2O[CF(CF_3)CF_2O]_nCF(CF_3)—(CF_2)_m—Z^1$ (m is 0 or an integer of 1 to 10; n is 0 or an integer of 1 to 8), $CH_2=CFCF_2O[CF(CF_3)CF_2O]_nCF(CF_3)—(CF_2)_m—(CH_2)_l—Z^1$ (l is an integer of 1 to 4; m is 0 or an integer of 1 to 10; n is 0 or an integer of 1 to 8), $CH_2=CFCF_2O(CF_2CF_2O)_n—(CF_2)_m—Z^1$ (m is 0 or an integer of 1 to 10; n is 0 or an integer of 1 to 8) and $CH_2=CFCF_2O(CF_2CF_2O)_n—(CF_2)_m—(CH_2)_l—Z^1$ (l is an integer of 1 to 4; m is 0 or an integer of 1 to 10; n is 0 or an integer of 1 to 8), wherein $Z^1$ is as defined above.

In addition, there can be preferably exemplified a structural unit derived from:

wherein $Rf^{13}$ and $Z^1$ are as defined above. More specifically there are structural units derived from monomers such as:

$CF_2=CF[OCF_2CF(CF_3)]_l—(CF_2)_m—Z^1$ (n is 0 or an integer of 1 to 8; m is 0 or an integer of 1 to 10), $CF_2=CF[OCF_2CF(CF_3)]_n—(CF_2)_m—(CH_2)_l—Z^1$ (l is an integer of 1 to 4; n is 0 or an integer of 1 to 8; m is 0 or an integer of 1 to 10), $CF_2=CF(OCF_2CF_2)_nO(CF_2)_m—Z^1$ (n is an integer of 1 to 8; m is 0 or an integer of 1 to 10) and $CF_2=CF(OCF_2CF_2)_nO(CF_2)_m—(CH_2)_l—Z^1$ (l is an integer of 1 to 4; n is 0 or an integer of 1 to 8; m is 0 or an integer of 1 to 10), wherein $Z^1$ is as defined above.

Examples of other fluorine-containing ethylenic monomers having functional group are:

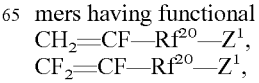

$CH_2=CH-Rf^{20}-Z^1$,
$CH_2=CF(CF_2)_nO-Rf^{20}-Z^1$ (n is 0 or an integer of 1 to 10),
$CF_2=CF(CF_2)_nO-Rf^{20}-Z^1$ (n is 0 or an integer of 1 to 10),
$CH_2=CH(CF_2)_nO-Rf^{20}-Z^1$ (n is 0 or an integer of 1 to 10),
$CH_2=CF-CO_2-Rf^{20}-Z^1$ and
$CH_2=C(CF_3)-CO_2-Rf^{20}-Z^1$
wherein $Rf^{20}$ is a fluorine-containing alkylene group having 1 to 40 carbon atoms or a fluorine-containing alkylene group having 2 to 100 carbon atoms and ether bond. More specifically there are:
$CH_2=CF(Rf^{\beta})_n-Z^1$ ($Rf^{\beta}$ is $CF_2$, $CH_2$, $CF_2CFCl$, $CF_2CF(CF_3)$ or $CF_2CH_2$; n is 0 or an integer of 1 to 20),
$CH_2=CF(Rf^{\beta})_n-(CH_2)_l-Z^1$ ($Rf^{\beta}$ is $CF_2$, $CH_2$, $CF_2CFCl$, $CF_2CF(CF_3)$ or $CF_2CH_2$; l is an integer of 1 to 4; n is 0 or an integer of 1 to 20),
$CF_2=CF(Rf^{\beta})_n-Z^1$ ($Rf^{\beta}$ is $CF_2$, $CH_2$, $CF_2CFCl$, $CF_2CF(CF_3)$ or $CF_2CH_2$; n is 0 or an integer of 1 to 20),
$CF_2=CF(Rf^{\beta})_n-(CH_2)_l-Z^1$ ($Rf^{\beta}$ is $CF_2$, $CH_2$, $CF_2CFCl$, $CF_2CF(CF_3)$ or $CF_2CH_2$; l is an integer of 1 to 4; n is 0 or an integer of 1 to 20),
$CH_2=CH(Rf^{\beta})_n-Z^1$ ($Rf^{\beta}$ is $CF_2$, $CH_2$, $CF_2CFCl$, $CF_2CF(CF_3)$ or $CF_2CH_2$; n is 0 or an integer of 1 to 20),
$CH_2=CH(Rf^{\beta})_n-(CH_2)_l-Z^1$ ($Rf^{\beta}$ is $CF_2$, $CH_2$, $CF_2CFCl$, $CF_2CF(CF_3)$ or $CF_2CH_2$; l is an integer of 1 to 4; n is 0 or an integer of 1 to 20),
$CH_2=CF(CF_2)_nO[CF(CF_3)CF_2O]_mCF(CF_3)-(CF_2)_p-Z^1$ (n is 0 or an integer of 1 to 10; m is 0 or an integer of 1 to 8; p is 0 or an integer of 1 to 10),
$CH_2=CF(CF_2)_nO[CF(CF_3)CF_2O]_mCF(CF_3)-(CF_2)_p-(CH_2)_l-Z^1$ (l is an integer of 1 to 4; n is 0 or an integer of 1 to 10; m is 0 or an integer of 1 to 8; p is 0 or an integer of 1 to 10),
$CF_2=CF(CF_2)_nO[CF(CF_3)CF_2O]_mCF(CF_3)-(CF_2)_p-Z^1$ (n is 0 or an integer of 1 to 10; p is 0 or an integer of 1 to 10; m is 0 or an integer of 1 to 8),
$CF_2=CF(CF_2)_nO[CF(CF_3)CF_2O]_mCF(CF_3)-(CF_2)_p-(CH_2)_l-Z^1$ (l is an integer of 1 to 4; n is 0 or an integer of 1 to 10; m is 0 or an integer of 1 to 8; p is 0 or an integer of 1 to 10),
$CH_2=CH(CF_2)_nO[CF(CF_3)CF_2O]_mCF(CF_3)-(CF_2)_p-Z^1$ (n is 0 or an integer of 1 to 10; m is 0 or an integer of 1 to 10; p is 0 or an integer of 1 to 8),
$CH_2=CH(CF_2)_nO[CF(CF_3)CF_2O]_mCF(CF_3)-(CF_2)_p-(CH_2)_l-Z^1$ (l is an integer of 1 to 4; n is 0 or an integer of 1 to 10; m is 0 or an integer of 1 to 8; p is 0 or an integer of 1 to 10),
$CH_2=CF(CF_2)_nO(CF_2CF_2O)_m(CF_2)_p-Z^1$ (n is 0 or an integer of 1 to 10; m is 0 or an integer of 1 to 8; p is 0 or an integer of 1 to 10),
$CH_2=CF(CF_2)_nO(CF_2CF_2O)_m(CF_2)_p-(CH_2)_l-Z^1$ (l is an integer of 1 to 4; n is 0 or an integer of 1 to 10; m is 0 or an integer of 1 to 8; p is 0 or an integer of 1 to 10),
$CF_2=CF(CF_2)_nO(CF_2CF_2O)_m(CF_2)_p-Z^1$ (n is 0 or an integer of 1 to 10; m is 0 or an integer of 1 to 8; p is 0 or an integer of 1 to 10),
$CF_2=CF(CF_2)_nO(CF_2CF_2O)_m(CF_2)_p-(CH_2)_l-Z^1$ (l is an integer of 1 to 4; n is 0 or an integer of 1 to 10; m is 0 or an integer of 1 to 8; p is 0 or an integer of 1 to 10),
$CH_2=CH(CF_2)_nO(CF_2CF_2O)_m(CF_2)_p-Z^1$ (n is 0 or an integer of 1 to 10; m is 0 or an integer of 1 to 8; p is 0 or an integer of 1 to 10),
$CH_2=CH(CF_2)_nO(CF_2CF_2O)_m(CF_2)_p-(CH_2)_l-Z^1$ (l is an integer of 1 to 4; n is 0 or an integer of 1 to 10; m is 0 or an integer of 1 to 8; p is 0 or an integer of 1 to 10),
$CH_2=CF-C_6X_4-Z^1$ (X is H or F),
$CH_2=CF-C_6X_4-(CH_2)_n-Z^1$ (X is H or F; n is an integer of 1 to 10),
$CF_2=CF-C_6X_4-Z^1$ (X is H or F),
$CF_2=CF-C_6X_4-(CH_2)_n-Z^1$ (X is H or F; n is an integer of 1 to 10),
$CH_2=CH-C_6X_4-Z^1$ (X is H or F),
$CH_2=CH-C_6X_4-(CH_2)_n-Z^1$ (X is H or F; n is an integer of 1 to 10),
$CH_2=CX-CO_2-(CH_2)_l-(CF_2)_n-(CH_2)_m-Z^1$ (X is F or $CF_3$; l is an integer of 1 to 4; n is 0 or an integer of 1 to 10; m is 0 or an integer of 1 to 4),
and the like, wherein $Z^1$ is as defined above.

(ii) Structural Units Derived from Fluorine-Containing Ethylenic Monomers Having No Functional Group These structural units are preferable from the viewpoint that oxidation resistance, heat resistance, high responsivity and mechanical strength of the fluorine-containing polymer having functional group or the cured article obtained therefrom can be improved. Also these structural units are preferable from the viewpoint that various kinds of monomers can be selected depending on intended applications, elongation, yield strength, hardness, dielectric constant, elastic modulus, processability, heat resistance, crystallinity and glass transition point can be adjusted, and particularly mechanical characteristics can be controlled in a wide range by copolymerization with the structural unit M.

Examples of the preferred structural units (ii) of a fluorine-containing ethylenic monomer are those represented by the formula (7):

$$-(CX^{15}X^{16}-CX^{17})- \atop (CX^{18}_2)_{h1}-(O)_{i1}-(Rf^{14})_j-Z^2 \tag{7}$$

wherein $X^{15}$, $X^{16}$ and $X^{18}$ are the same or different and each is H or F; $X^{17}$ is H, F or $CF_3$; h1, i1 and j are the same or different and each is 0 or 1; $Z^2$ is H, F or Cl; $Rf^{14}$ is a fluorine-containing alkylene group having 1 to 20 carbon atoms or a fluorine-containing alkylene group having 2 to 100 carbon atoms and ether bond.

Examples thereof are preferably structural units derived from monomers such as:
$CF_2=CF_2$, $CF_2=CH_2$, $CF_2=CFCl$, $CF_2=CFCF_3$, $$CH_2=C\begin{matrix}CF_3\\ \\CF_3,\end{matrix}$$

$CF_2=CFO(CF_2)_nF$ (n: from 1 to 5), $CH_2=C(CF_3)_2$, $CF_2=CFH$, $CF_2=CCl_2$, $$CF_2=CFOCF_2CFO-C_3F_7,\atop \quad\quad\quad\quad\quad |\atop\quad\quad\quad\quad\quad CF_3$$

$CH_2=CF-(CF_2)_n Z^2$ ($Z^2$ is as defined in the formula (7), n is from 1 to 10) and
$CH_2=CHOCH_2-(CF_2)_n Z^2$ ($Z^2$ is as defined in the formula (7), n is from 1 to 10).

(iii) Fluorine-Containing Aliphatic Ring Structural Units

Introduction of these structural units (iii) is preferable since there can be obtained the fluorine-containing polymer having functional group in which hardness is made up for.

Examples of the preferable fluorine-containing aliphatic ring structural unit (iii) are those represented by the formula (8):

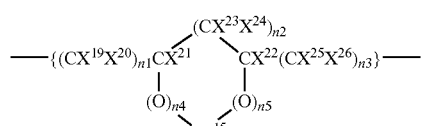

(8)

wherein $X^{19}$, $X^{20}$, $X^{23}$, $X^{24}$, $X^{25}$ and $X^{26}$ are the same or different and each is H or F; $X^{21}$ and $X^{22}$ are the same or different and each is H, F, Cl or $CF_3$; $Rf^{15}$ is a fluorine-containing alkylene group having 1 to 10 carbon atoms or a fluorine-containing alkylene group having 2 to 10 carbon atoms and ether bond; n2 is 0 or an integer of from 1 to 3; n1, n3, n4 and n5 are the same or different and each is 0 or 1.

For example, there is a structural unit represented by:

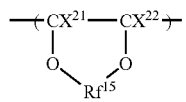

wherein $Rf^{15}$, $X^{21}$ and $X^{22}$ are as defined above.

Concretely there are:

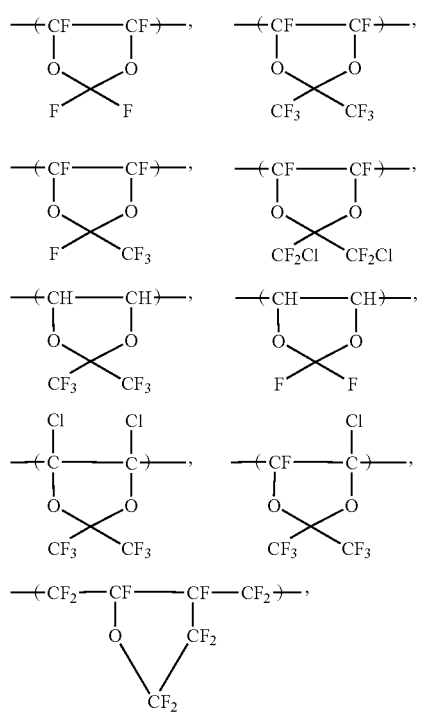

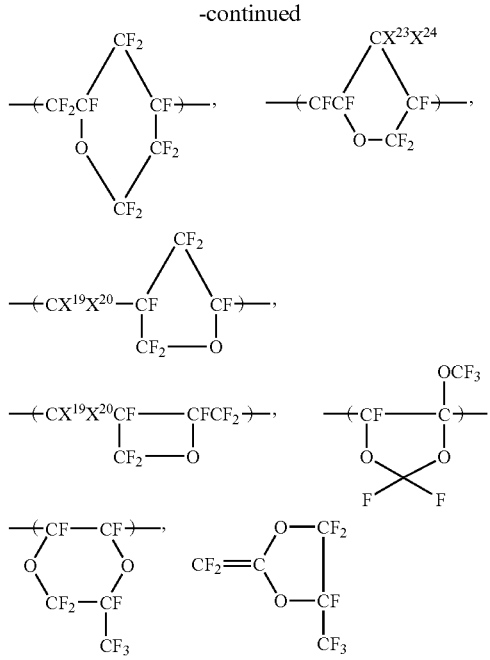

and the like, wherein $X^{19}$, $X^{20}$, $X^{23}$ and $X^{24}$ are as defined above.

(iv) Structural Units Derived from Ethylenic Monomers Having No Fluorine

The structural units (iv) derived from ethylenic monomers having no fluorine are preferable since solubility in a general-purpose solvent and compatibility with the ionic liquid are improved and compatibility with a photo-catalyst and a curing agent to be added as case demands are improved.

Examples of the non-fluorine-containing ethylenic monomer are as follows.

(iv-1) Ethylene, propylene, butene, isoprene, butadiene, vinyl chloride, vinylidene chloride and maleic anhydride.

(iv-2) Vinyl ether or vinyl ester monomers: $CH_2$=CHOR, $CH_2$=CHOCOR (R: hydrocarbon group having 1 to 20 carbon atoms), —$(CH_2)_{1-10}CH_2OH$.

Acrylonitrile: $CH_2$=CXCN (X: H, F, $CH_3$ or Cl).

Styrene: $CH_2$=CX—$C_6H_4$—R (X: H, F or $CH_3$; R: H, OH, OR, $CO_2H$, $CO_2R^1$ ($R^1$: hydrocarbon group having 1 to 20 carbon atoms), $CO_2M$, $SO_3H$, $SO_3R^1$ ($R^1$: hydrocarbon group having 1 to 20 carbon atoms), $SO_3M$, $NO_2$, CN and $CF_3$.

(iv-3) Acrylic or methacrylic monomers: $CH_2$=CXCOR, $CH_2$=C($CH_3$)COR

[X: H, F or Cl, R: OH or $OR^1$ ($R^1$: hydrocarbon group having 1 to 20 carbon atoms)], —$(CH_2)_{1-10}CH_2OH$, $NH_{2-x}R^1_x$ (x: 0 to 2, $R^1$: hydrocarbon group having 1 to 20 carbon atoms) and —$(CH_2)_{1-10}CH_2OH$.

In the fluorine-containing polymer (Ia) having functional group used in the present invention, various combinations and proportions of the structural unit M (M1, M2 or M3) and the structural unit A can be selected from the above-mentioned examples depending on intended applications and physical properties (elastic modulus, elongation, yield strength, glass transition point, hardness, heat resistance, dielectric constant and crystallinity).

The fluorine-containing polymer (Ia) having functional group used in the present invention contains the structural unit M (M1, M2 or M3) as essential component, and the structural unit M has a feature of making the polymer easily dissolved in the ionic liquid. Therefore, even if the fluorine-containing polymer (Ia) having functional group contains a larger amount of the structural unit M or in the extreme case, even if the polymer consists of the structural unit M (100% by mole), a feature of making the polymer easily dissolved in the ionic liquid can be maintained high.

Also in the case where the fluorine-containing polymer (Ia) having functional group is a copolymer comprising the structural unit M and the structural unit A, when the structural unit A is selected from the above-mentioned examples, there can be obtained the polymer having higher oxidation resistance, heat resistance, mechanical strength, and responsivity.

In the case where the fluorine-containing polymer (Ia) having functional group is a copolymer comprising the structural unit M and the structural unit A, the proportion of the structural unit M is not less than 0.1% by mole based on the whole structural units constituting the fluorine-containing polymer (Ia) having functional group.

It is preferable that the proportion is not less than 1.0% by mole in order not to cause separation of the fluorine-containing polymer (Ia) having functional group, though it depends on compatibility of the structural unit A with the ionic liquid and a concentration of the ionic liquid to be mixed to the fluorine-containing polymer (Ia) having functional group.

The fluorine-containing polymer (Ia) having functional group of the present invention can be used even if the proportion of the structural unit M is increased. Since increase in the proportion of the structural unit M is apt to make mechanical properties insufficient, the proportion is preferably not more than 60% by mole, though it depends on mechanical strength of the structural unit A.

A number average molecular weight of the fluorine-containing polymer (Ia) having functional group of the present invention can be selected within a range from 500 to 1,000,000, preferably from 1,000 to 500,000, especially from 2,000 to 200,000.

If the molecular weight is too low, mechanical properties are apt to be insufficient, and particularly a cured article and a cured coating film are apt to be fragile and insufficient in strength. If the molecular weight is too high, solubility in a solvent is lowered, particularly film forming property and leveling property are apt to be lowered at forming a thin film. For coating application, most preferable molecular weight is selected within a range from 5,000 to 100,000 in number average molecular weight.

The second of the fluorine-containing polymer (I) having functional group usable in the present invention is a fluorine-containing polymer (Ib) having functional group and represented by the formula (1b):

(1b)

wherein the structural unit N is a structural unit derived from at least one fluorine-containing monomer having no specific functional group mentioned above; the structural unit B is a structural unit derived from at least one non-fluorine-containing monomer having the above-mentioned specific functional group. Further, as case demands, a non-fluorine-containing monomer having no specific functional group may be copolymerized with the polymer (Ib).

The second fluorine-containing polymer (Ib) having functional group is a known polymer, and those disclosed in JP5-194668A, JP9-169822A and JP2000-313839A can be used. A wide variety of polymers such as not only usual addition polymerization polymers but also block polymerization polymers disclosed in JP9-165490A and JP2000-80136A and graft polymerization polymers disclosed in JP9-157619A can be used.

Examples of the fluorine-containing monomer having no specific functional group and providing the structural unit N are: $CF_2=CF_2$, $CF_2=CH_2$, $CF_2=CFCl$, $CF_2=CF(CF_3)$, $CF_2=C(CF_3)_2$, $CF_2=CCl_2$, $CF_2=CHF$, $CH_2=CHF$, $CH_2=C(CF_3)_2$, $CF_2=CFO(CF_2)_nF$ (n is 0 or an integer of 1 to 10), $CF_2=CFO[CF_2CF(CF_3)]_nOC_3F_7$ (n is 0 or an integer of 1 to 8) and $CH_2=CFCF_2O[CF(CF_3)CF_2]_nOCHFCF_3$ (n is 0 or an integer of 1 to 8)

and the like.

Further the structural unit N may be a fluorine-containing aliphatic ring structural unit, and there is, for example, a fluorine-containing aliphatic ring structural unit giving the formula (8):

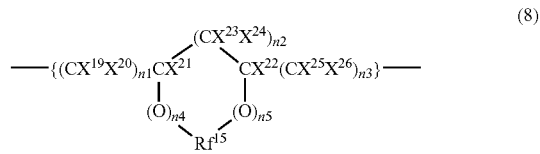

(8)

wherein $X^{19}$, $X^{20}$, $X^{23}$, $X^{24}$, $X^{25}$ and $X^{26}$ are the same or different and each is H or F; $X^{21}$ and $X^{22}$ are the same or different and each is H, F, Cl or $CF_3$; $Rf^{15}$ is a fluorine-containing alkylene group having 1 to 10 carbon atoms or a fluorine-containing alkylene group having 2 to 10 carbon atoms and ether bond; n2 is 0 or an integer of from 1 to 3; n1, n3, n4 and n5 are the same or different and each is 0 or 1.

For example, there is a fluorine-containing aliphatic ring structural unit represented by:

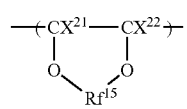

wherein $Rf^{15}$, $X^{21}$ and $X^{22}$ are as defined above.

Concretely there are:

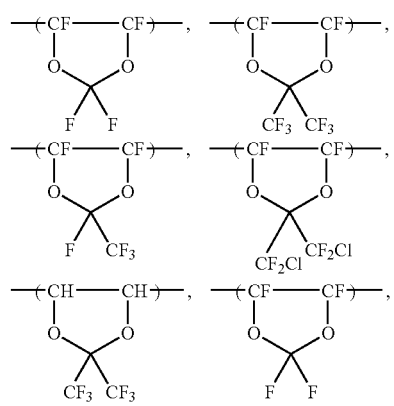

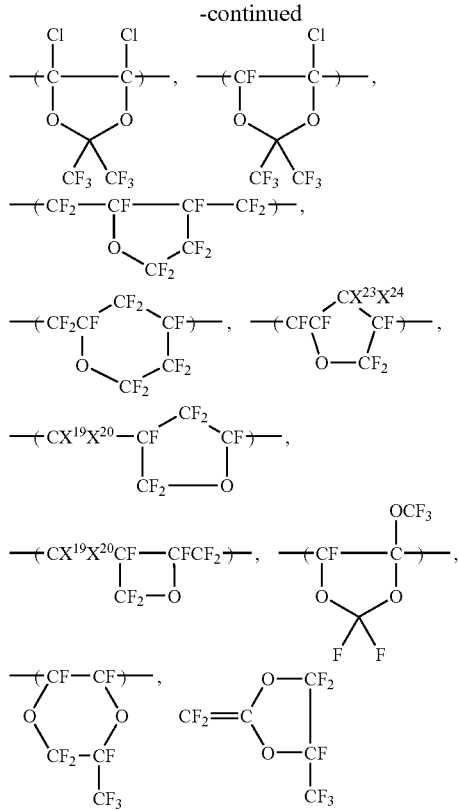

and the like, wherein $X^{19}$, $X^{20}$, $X^{23}$ and $X^{24}$ are as defined above.

Examples of the non-fluorine-containing monomers having a specific functional group and providing the structural unit B are, for instance,
$CH_2=CXRf'$ (X is H, $CH_3$ or Cl),
$CH_2=CHO-CH_2(CH_2)_n-Rf'$ (n is 0 or an integer of 1 to 10),
$CH_2=CHOCO-CH_2(CH_2)_n-Rf'$ (n is 0 or an integer of 1 to 10),
$CH_2=CX-C_6H_4-(CH_2)_n-Rf'$ (X is H, $CH_3$ or Cl; n is 0 or an integer of 1 to 10),
$CH_2=CXCOO-(CH_2)_n-Rf'$ (X is H, $CH_3$ or Cl; n is an integer of 1 to 10),
$CH_2=CXCONR-(CH_2)_n-Rf'$ (X is H, $CH_3$ or Cl; R is hydrogen atom or a hydrocarbon group having 1 to 20 carbon atoms; n is an integer of 1 to 10).
and the like, when a moiety having a specific functional group is represented by Rf'.

More specifically there are:
$CH_2=CHCOOR^1$ ($R^1$ is hydrogen atom or a hydrocarbon group having 1 to 20 carbon atoms),
$CH_2=CHCN$,
$CH_2=CHI$,
$CH_2=C(CH_3)COOR^1$ ($R^1$ is hydrogen atom or a hydrocarbon group having 1 to 20 carbon atoms),
$CH_2=C(CH_3)CN$,
$CH_2=C(CH_3)I$,
$CH_2=CClCOOR^1$ ($R^1$ is hydrogen atom or a hydrocarbon group having 1 to 20 carbon atoms),
$CH_2=CClCN$,
$CH_2=CClI$,
$CH_2=CHO-CH_2(CH_2)_n-COOR^1$ ($R^1$ is hydrogen atom or a hydrocarbon group having 1 to 20 carbon atoms; n is 0 or an integer of 1 to 10),
$CH_2=CHO-CH_2(CH_2)_n-CN$ (n is 0 or an integer of 1 to 10),
$CH_2=CHO-CH_2(CH_2)_n-I$ (n is 0 or an integer of 1 to 10),
$CH_2=CHO-CH_2(CH_2)_n-OH$ (n is 0 or an integer of 1 to 10),
$CH_2=CHOCO-CH_2(CH_2)_n-COOR^1$ ($R^1$ is hydrogen atom or a hydrocarbon group having 1 to 20 carbon atoms; n is 0 or an integer of 1 to 10),
$CH_2=CHOCO-CH_2(CH_2)_n-CN$ (n is 0 or an integer of 1 to 10),
$CH_2=CHOCO-CH_2(CH_2)_n-I$ (n is 0 or an integer of 1 to 10),
$CH_2=CHOCO-CH_2(CH_2)_n-OH$ (n is 0 or an integer of 1 to 10),
$CH_2=CH-C_6H_4-(CH_2)_n-COOR^1$ ($R^1$ is hydrogen atom or a hydrocarbon group having 1 to 20 carbon atoms; n is 0 or an integer of 1 to 10),
$CH_2=CH-C_6H_4-(CH_2)_n-CN$ (n is 0 or an integer of 1 to 10),
$CH_2=CH-C_6H_4-(CH_2)_n-I$ (n is 0 or an integer of 1 to 10),
$CH_2=CH-C_6H_4-(CH_2)_n-OH$ (n is 0 or an integer of 1 to 10),
$CH_2=C(CH_3)-C_6H_4-(CH_2)_n-COOR^1$ ($R^1$ is hydrogen atom or a hydrocarbon group having 1 to 20 carbon atoms; n is 0 or an integer of 1 to 10),
$CH_2=C(CH_3)-C_6H_4-(CH_2)_n-CN$ (n is 0 or an integer of 1 to 10),
$CH_2=C(CH_3)-C_6H_4-(CH_2)_n-I$ (n is 0 or an integer of 1 to 10),
$CH_2=C(CH_3)-C_6H_4-(CH_2)_n-OH$ (n is 0 or an integer of 1 to 10),
$CH_2=CCl-C_6H_4-(CH_2)_n-COOR^1$ ($R^1$ is hydrogen atom or a hydrocarbon group having 1 to 20 carbon atoms; n is 0 or an integer of 1 to 10),
$CH_2=CCl-C_6H_4-(CH_2)_n-CN$ (n is 0 or an integer of 1 to 10),
$CH_2=CCl-C_6H_4-(CH_2)_n-I$ (n is 0 or an integer of 1 to 10),
$CH_2=CCl-C_6H_4-(CH_2)_n-OH$ (n is 0 or an integer of 1 to 10),
$CH_2=CHCOO-(CH_2)_n-COOR^1$ ($R^1$ is hydrogen atom or a hydrocarbon group having 1 to 20 carbon atoms; n is an integer of 1 to 10),
$CH_2=CHCOO-(CH_2)_n-CN$ (n is an integer of 1 to 10),
$CH_2=CHCOO-(CH_2)_n-I$ (n is an integer of 1 to 10),
$CH_2=CHCOO-(CH_2)_n-OH$ (n is an integer of 1 to 10),
$CH_2=C(CH_3)COO-(CH_2)_n-COOR^1$ ($R^1$ is hydrogen atom or hydrocarbon group having 1 to 20 carbon atoms; n is an integer of 1 to 10),
$CH_2=C(CH_3)COO-(CH_2)_n-CN$ (n is an integer of 1 to 10),
$CH_2=C(CH_3)COO-(CH_2)_n-I$ (n is an integer of 1 to 10),
$CH_2=C(CH_3)COO-(CH_2)_n-OH$ (n is an integer of 1 to 10),
$CH_2=CClCOO-(CH_2)_n-COOR^1$ ($R^1$ is hydrogen atom or a hydrocarbon group having 1 to 20 carbon atoms; n is an integer of 1 to 10),
$CH_2=CClCOO-(CH_2)_n-CN$ (n is an integer of 1 to 10),
$CH_2=CClCOO-(CH_2)_n-I$ (n is an integer of 1 to 10),
$CH_2=CClCOO-(CH_2)_n-OH$ (n is an integer of 1 to 10),
$CH_2=CHCONH-(CH_2)_n-COOR^1$ ($R^1$ is hydrogen atom or a hydrocarbon group having 1 to 20 carbon atoms; n is an integer of 1 to 10),
$CH_2=CHCONH-(CH_2)_n-CN$ (n is an integer of 1 to 10),
$CH_2=CHCONH-(CH_2)_n-I$ (n is an integer of 1 to 10),
$CH_2=CHCONH-(CH_2)_n-OH$ (n is an integer of 1 to 10), $CH_2=CHCON(CH_3)-(CH_2)_n-COOR^1$ ($R^1$ is hydrogen atom or a hydrocarbon group having 1 to 20 carbon atoms; n is an integer of 1 to 10),
$CH_2=CHCON(CH_3)-(CH_2)_n-CN$ (n is an integer of 1 to 10),
$CH_2=CHCON(CH_3)-(CH_2)_n-I$ (n is an integer of 1 to 10),
$CH_2=CHCON(CH_3)-(CH_2)_n-OH$ (n is an integer of 1 to 10),
$CH_2=C(CH_3)CONH-(CH_2)_n-COOR^1$ ($R^1$ is hydrogen atom or a hydrocarbon group having 1 to 20 carbon atoms; n is an integer of 1 to 10),
$CH_2=C(CH_3)CONH-(CH_2)_n-CN$ (n is an integer of 1 to 10),
$CH_2=C(CH_3)CONH-(CH_2)_n-I$ (n is an integer of 1 to 10),
$CH_2=C(CH_3)CONH-(CH_2)_n-OH$ (n is an integer of 1 to 10),
$CH_2=CClCONH-(CH_2)_n-COOR^1$ ($R^1$ is hydrogen atom or a hydrocarbon group having 1 to 20 carbon atoms; n is an integer of 1 to 10),
$CH_2=CClCONH-(CH_2)_n-CN$ (n is an integer of 1 to 10),
$CH_2=CClCONH-(CH_2)_n-I$ (n is an integer of 1 to 10), and
$CH_2=CClCONH-(CH_2)_n-OH$ (n is an integer of 1 to 10).

Examples of the non-fluorine-containing monomer having no specific functional group which is an optional comonomer are, for instance, non-fluorine-containing olefins such as ethylene, propylene, butene, isoprene, butadiene, vinyl chloride and vinylidene chloride; vinyl ether or vinyl ester monomers such as $CH_2=CHOR$, $CH_2=CHOCOR$ (R: a hydrocarbon group having 1 to 20 carbon atoms), and $-(CH_2)_{1-10}CH_2OH$, and styrene monomers such as $CH_2=CX-C_6H_4-R$ (X: H or $CH_3$, R: H, OH, OR, $CO_2H$ or $CO_2R^1$ ($R^1$: a hydrocarbon group having 1 to 20 carbon atoms)), $CO_2M$ and $NO_2$.

In the fluorine-containing polymer (Ib) having functional group used in the present invention, various combinations and proportions of the structural unit N and the structural unit B can be selected from the above-mentioned examples, depending on intended applications and physical properties (elastic modulus, elongation, yield strength, glass transition point, hardness, heat resistance, dielectric constant and crystallinity).

The fluorine-containing polymer (Ib) having functional group used in the present invention contains the structural unit B as essential component, and the structural unit B has a feature of making the polymer easily dissolved in the ionic liquid. Therefore, in the case of a relatively low molecular weight, even if the structural unit B is contained in a smaller amount, the polymer can be easily dissolved in the ionic liquid.

Also in the case where the fluorine-containing polymer (Ib) having functional group is a copolymer comprising the structural unit N and the structural unit B, when the structural unit N is selected from the above-mentioned examples, there can be obtained the polymer having higher oxidation resistance, heat resistance, mechanical strength, and responsivity.

In the case where the fluorine-containing polymer (Ib) having functional group is a copolymer comprising the structural unit N and the structural unit B, the proportion of the structural unit B may be not less than 0.1% by mole based on the whole structural units constituting the fluorine-containing polymer (Ib) having functional group.

It is preferable that the proportion is not less than 1.0% by mole in order not to cause separation of the fluorine-containing polymer (Ib) having functional group, though it depends on compatibility of the structural unit B with the ionic liquid and a concentration of the ionic liquid to be mixed to the fluorine-containing polymer (Ib) having functional group.

The fluorine-containing polymer (Ib) having functional group of the present invention can be used even if the proportion of the structural unit B is increased. Since increase in the proportion of the structural unit B is apt to make mechanical properties insufficient, the proportion is preferably not more than 60% by mole, though it depends on mechanical strength of the structural unit N.

A number average molecular weight of the fluorine-containing polymer (Ib) having functional group used in the present invention can be selected within a range from 500 to 1,000,000, preferably from 1,000 to 500,000, especially from 2,000 to 200,000.

If the molecular weight is too low, mechanical properties are apt to be insufficient, and particularly a cured article and a cured coating film are apt to be fragile and insufficient in strength. If the molecular weight is too high, solubility in a solvent is lowered, particularly film forming property and leveling property are apt to be lowered at forming a thin film. For coating application, most preferable molecular weight is selected within a range from 5,000 to 100,000 in number average molecular weight.

The third of the fluorine-containing polymer (I) having functional group usable in the present invention is a fluorine-containing polymer (Ic) having iodine atom at its end which is obtained by polymerizing a fluorine-containing monomer alone or a monomer mixture comprising a fluorine-containing monomer by an iodine transfer polymerization method.

The iodine transfer polymerization method and the fluorine-containing polymer (Ic) prepared by such a method are known, and those disclosed, for example, in JP2005-104992A and JP2004-59597A can be used in the present invention, too.

The polymer may have iodine atom only at one end thereof, but it is preferable that iodine atoms exist at both ends of the polymer from the viewpoint of improving compatibility with the ionic liquid.

Especially preferable examples of the fluorine-containing polymer (Ic) having iodine atom at its end are polyvinylidene fluoride, polytetrafluoroethylene, polychlorotrifluoroethylene, polytrifluoroethylene, polyvinyl fluoride, vinylidene fluoride/hexafluoropropylene copolymer, vinylidene fluoride/tetrafluoroethylene copolymer, vinylidene fluoride/chlorotrifluoroethylene copolymer, vinylidene fluoride/perfluoro (alkyl vinyl ether) copolymer, vinylidene fluoride/hexafluoroacetone copolymer, vinylidene fluoride/pentafluoropropylene copolymer, ethylene/tetrafluoroethylene copolymer, propylene/tetrafluoroethylene copolymer, tetrafluoroethylene/hexafluoropropylene copolymer, tetrafluoroethylene/perfluoro(alkyl vinyl ether) copolymer, tetrafluoroethylene/perfluoro-2,2-dimethyl-1,3-dioxole copolymer, ethylene/chlorotrifluoroethylene copolymer, vinylidene fluoride/tetrafluoroethylene/hexafluoropropylene copolymer, and vinylidene fluoride/tetrafluoroethylene/perfluoro (alkyl vinyl ether) copolymer.

A number average molecular weight of the fluorine-containing polymer (Ic) of the present invention having iodine atom at its end can be selected within a range from 500 to 10,000, preferably from 1,000 to 5,000.

If the molecular weight is too low, mechanical properties are apt to be insufficient, and particularly a cured article and a cured coating film are apt to be fragile and insufficient in strength. If the molecular weight is too high, solubility in a solvent is lowered, particularly film forming property and leveling property are apt to be lowered at forming a thin film.

The fourth of the fluorine-containing polymer (I) having functional group usable in the present invention is a fluorine-containing polymer (Id) having a modified end which is obtained by modifying an end of a fluorine-containing polymer having a fluorine-containing structural unit with the above-mentioned specific functional group.

Such a method of modifying a polymer end and an end-modified fluorine-containing polymer (Id) prepared by the method are known, and those disclosed, for example, in JP2001-81131A, JP11-322842A and JP2003-176394A can be used in the present invention, too.

Modification may be carried out only on one polymer end, but it is preferable to modify the both polymer ends from the viewpoint of improvement in compatibility with the ionic liquid. The functional group after the modification is preferably —COOH or —OH from the viewpoint of easy modification.

Preferable examples of the end-modified fluorine-containing polymer (Id) are polyvinylidene fluoride, polytetrafluoroethylene, polychlorotrifluoroethylene, polytrifluoroethylene, polyvinyl fluoride, vinylidene fluoride/hexafluoropropylene copolymer, vinylidene fluoride/tetrafluoroethylene copolymer, vinylidene fluoride/chlorotrifluoroethylene copolymer, vinylidene fluoride/perfluoro(alkyl vinyl ether) copolymer, vinylidene fluoride/hexafluoroacetone copolymer, vinylidene fluoride/pentafluoropropylene copolymer, ethylene/tetrafluoroethylene copolymer, propylene/tetrafluoroethylene copolymer, tetrafluoroethylene/hexafluoropropylene copolymer, tetrafluoroethylene/perfluoro(alkyl vinyl ether) copolymer, tetrafluoroethylene/perfluoro-2,2-dimethyl-1,3-dioxole copolymer, ethylene/chlorotrifluoroethylene copolymer, vinylidene fluoride/tetrafluoroethylene/hexafluoropropylene copolymer, and vinylidene fluoride/tetrafluoroethylene/perfluoro(alkyl vinyl ether) copolymer.

A number average molecular weight of the end-modified fluorine-containing polymer (Id) used in the present invention can be selected, for example, within a range from 500 to 10,000, preferably from 1,000 to 5,000.

If the molecular weight is too low, mechanical properties are apt to be insufficient, and particularly a cured article and a cured coating film are apt to be fragile and insufficient in strength. If the molecular weight is too high, solubility in a solvent is lowered, particularly film forming property and leveling property are apt to be lowered at forming a thin film.

The ionic liquid (II) used in the present invention is one called a normal temperature molten salt or one simply called a molten salt, and is a salt showing a molten state within a wide temperature range including normal temperature (room temperature).

In the present invention, while various known ionic liquids can be used, preferable are those which are stable and show a molten state at normal temperature (room temperature) or a temperature as close to normal temperature as possible. In the present invention, preferable are normal temperature molten salts having electric conductivity of not less than 0.1 Sm$^{-1}$.

Examples of ionic liquid suitably used in the present invention are those comprising a cation (preferably imidazolium ion) represented by the following general formulas (I) to (IV) and an anion (X$^-$).

Formula (I):

Formula (II):

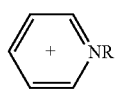

Formula (III):

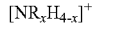

[NR$_x$H$_{4-x}$]$^+$

Formula (IV):

[PR$_x$H$_{4-x}$]$^+$

In these formulas (I) to (IV), R is an alkyl group which may have halogen atom and has 1 to 12 carbon atoms or an alkyl group which may have halogen atom, has ether bond and has the total number of carbon atoms and oxygen atoms of 3 to 12, and in the formula (I), R$^1$ is hydrogen atom or an alkyl group which may have halogen atom and has 1 to 4 carbon atoms. In the formula (I), it is preferable that R and R$^1$ are not the same. In the formulas (III) and (IV), each of x is an integer of 1 to 4.

Further there can be used salts of fluorine-containing imidazole compounds represented by the formula (V):

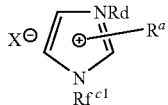

wherein R$^a$s are the same or different, and each is halogen atom, a functional group or an organic group and may be present or may not be present, and when R$^a$s are present, the whole or a part of hydrogen atoms of the heteroaromatic ring are substituted by them; Rf$^{c1}$ is a fluoroalkyl group represented by the formula (c):

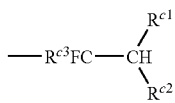

wherein R$^{c1}$, R$^{c2}$ and R$^{c3}$ are the same or different and each is H, halogen atom, a functional group or a monovalent organic group which may be substituted by halogen atom and may have ether bond and a polymerizable group, or Rf$^{c1}$ is a monovalent organic group which may have at least one residue obtained by excluding Rf$^{c1}$ group from the formula (V); Rd is H or a monovalent organic group; X is a counter anion.

Among these salts of fluorine-containing imidazole compounds, the compounds other than those having Rf$^{c1}$ of —CFHCF$_3$, —CF$_2$CFZ$^3$H or —CF=CFZ$^3$ (Z$^3$ is F or Cl) are novel compounds.

The salts of fluorine-containing imidazole compounds of the formula (V) can be prepared by allowing an imidazole compound represented by the formula (A):

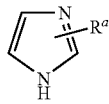

wherein $R^a$s are the same or different, and each is halogen atom, a functional group or an organic group and may be present or may not be present, and when $R^a$s are present, the whole or a part of hydrogen atoms of the heteroaromatic ring are substituted by them, to react with a fluoroalkene (B) represented by the formula (B):

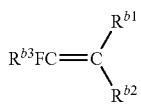

wherein $R^{b1}$, $R^{b2}$ and $R^{b3}$ are the same or different and each is H, halogen atom, a functional group or a monovalent organic group which may be substituted by halogen atom and may have ether bond and a polymerizable group, to synthesize a fluorine-containing imidazole compound represented by the formula (C):

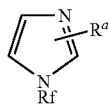

wherein $R^a$s are the same or different, and each is halogen atom, a functional group or an organic group and may be present or may not be present, and when $R^a$s are present, the whole or a part of hydrogen atoms of the heteroaromatic ring are substituted by them; Rf is $Rf^1$ where $Rf^1$ is the same as the formula (c) or is a monovalent organic group which may have at least one residue obtained by excluding Rf group from the formula (C),
and then acting a salt forming compound on the obtained imidazole compound and, if necessary carrying out anion exchange.

Nonlimiting examples of imidazole compound cation are, for instance, non-fluorine-containing imidazole compound cations such as 1-ethyl-3-methylimidazolium cation, 1-methyl-3-propylimidazolium cation, 1-isopropyl-3-methylimidazolium cation, 1-butyl-3-methylimidazolium cation, 1-isobutyl-3-methylimidazolium 1-sec-butyl-3-methylimidazolium cation, 1-methoxymethyl-3-methylimidazolium cation, 1-methoxyethyl-3-methylimidazolium cation, 1-ethyl-3-propylimidazolium cation, 1-ethyl-3-isopropylimidazolium cation, 1-ethyl-3-butylimidazolium cation, 1-ethyl-3-isobutylimidazolium cation, 1-ethyl-3-sec-butylimidazolium cation, 1-ethyl-3-methoxymethylimidazolium cation, 1-ethyl-3-methoxyethylimidazolium cation, 1-methylimidazolium cation, 1-ethylimidazolium cation, 1-propylimidazolium cation, 1-isopropylimidazolium cation, 1-butylimidazolium cation, 1-isobutylimidazolium cation, 1-sec-butylimidazolium cation, 1-methoxymethylimidazolium cation, 1-methoxyethylimidazolium cation, 1,2-dimethyl-3-ethylimidazolium cation, 1,2-dimethyl-3-propylimidazolium cation, 1,2-dimethyl-3-isopropylimidazolium cation, 1,2-dimethyl-3-butylimidazolium cation, 1,2-dimethyl-3-isobutylimidazolium cation, 1,2-dimethyl-3-sec-butylimidazolium cation, 1,2-dimethyl-3-methoxymethylimidazolium cation, 1,2-dimethyl-3-methoxyethylimidazolium cation and 1,2-dimethyl-3-methoxyethylimidazolium cation; and fluorine-containing imidazole compound cations such as 1-methyl-3-trifluoromethylimidazolium cation, 1-difluoromethyl-3-methylimidazolium cation, 1-methyl-3-pentafluoroethylimidazolium cation, 1-methyl-3-(2,2,2-trifluoroethyl)imidazolium cation, 1-(1,1-difluoroethyl)-3-methylimidazolium cation, 1-methyl-3-(1,1,2,2-tetrafluoroethyl)imidazolium cation, 1-(2-chloro-1,1,2-trifluoroethyl)-3-methylimidazolium cation, 1-heptafluoropropyl-3-methylimidazolium cation, 1-heptafluoroisopropyl-3-methylimidazolium cation, 1-(1,1,2,3,3,3-hexafluoropropyl)-3-methylimidazolium cation, 1-methyl-3-(1,1,2,3,3,4,4,4-octafluorobutyl)imidazolium cation, 1-methyl-3-(2-trifluoromethoxy-1,1,2-trifluoroethyl)imidazolium cation, 1-(2-heptafluoropropoxy-1,1,2-trifluoroethyl)-3-methylimidazolium cation, 1-ethyl-3-trifluoromethylimidazolium cation, 1-difluoromethyl-3-ethylimidazolium cation, 1-ethyl-3-pentafluoroethylimidazolium cation, 1-ethyl-3-(2,2,2-trifluoroethyl)imidazolium cation, 1-(1,1-difluoroethyl)-3-ethylimidazolium cation, 1-ethyl-3-(1,1,2,2-tetrafluoroethyl)imidazolium cation, 1-(2-chloro-1,1,2-trifluoroethyl)-3-ethylimidazolium cation, 1-ethyl-3-heptafluoropropylimidazolium cation, 1-ethyl-3-heptafluoroisopropylimidazolium cation, 1-ethyl-3-(1,1,2,3,3,3-hexafluoropropyl)imidazolium cation, 1-ethyl-3-(1,1,2,3,3,4,4,4-octafluorobutyl)imidazolium cation, 1-ethyl-3-(2-trifluoromethoxy-1,1,2-trifluoroethyl)imidazolium cation, 1-ethyl-3-(2-heptafluoropropoxy-1,1,2-trifluoroethyl)imidazolium cation, 1-trifluoromethylimidazolium cation, 1-difluoromethylimidazolium cation, 1-pentafluoroethylimidazolium cation, 1-(2,2,2-trifluoroethyl)imidazolium cation, 1-(1,1-difluoroethyl)imidazolium cation, 1-(1,1,2,2-tetrafluoroethyl)imidazolium cation, 1-(2-chloro-1,1,2-trifluoroethyl)imidazolium cation, 1-heptafluoropropylimidazolium cation, 1-heptafluoroisopropylimidazolium cation, 1-(1,1,2,3,3,3-hexafluoropropyl)imidazolium cation, 1-(1,1,2,3,3,4,4,4-octafluorobutyl)imidazolium cation, 1-(2-trifluoromethoxy-1,1,2-trifluoroethyl)imidazolium cation, 1-(2-heptafluoropropoxy-1,1,2-trifluoroethyl)imidazolium cation, 2-fluoro-1-ethyl-3-methylimidazolium cation, 2-fluoro-1-methyl-3-propylimidazolium cation, 2-fluoro-1-isopropyl-3-methylimidazolium cation, 2-fluoro-1-butyl-3-methylimidazolium cation, 2-fluoro-1-isobutyl-3-methylimidazolium cation, 2-fluoro-1-sec-butyl-3-methylimidazolium cation, 2-fluoro-1-methoxymethyl-3-methylimidazolium cation, 2-fluoro-1-methoxyethyl-3-methylimidazolium cation, 2-fluoro-1-methyl-3-trifluoromethylimidazolium cation, 2-fluoro-1-methyl-3-pentafluoroethylimidazolium cation, 2-fluoro-1-methyl-3-(2,2,2-trifluoroethyl)imidazolium cation, 2-fluoro-1-(1,1-difluoroethyl)-3-methylimidazolium cation, 2-fluoro-1-methyl-3-(1,1,2,2-tetrafluoroethyl)imidazolium cation, 1-(2-chloro-1,1,2-trifluoroethyl)-2-fluoro-3-methylimidazolium cation, 2-fluoro-1-heptafluoropropyl-3-methylimidazolium cation, 2-fluoro-1-heptafluoroisopropyl-3-methylimidazolium cation, 2-fluoro-1-(1,1,2,3,3,3-hexafluoropropyl)-3-methylimidazolium cation, 2-fluoro-1-methyl-3-(1,1,2,3,3,4,4,4-octafluorobutyl)imidazolium cation, 2-fluoro-1-methyl-3-(2-trifluoromethoxy-1,1,2-trifluoroethyl) imidazolium cation, 2-fluoro-1-(2-heptafluoropropoxy-1,1,2-trifluoroethyl)-3-methylimidazolium cation, 1,2-dimethyl-3-trifluoromethylimidazolium cation, 1,2-dimethyl-3-pentafluoroethylimidazolium cation, 1,2-dimethyl-3-(2,2,2-trifluoroethyl)imidazolium cation, 1,2-dimethyl-3-(1,1- difluoroethyl)imidazolium cation, 1,2-dimethyl-3-(1,1,2,2-tetrafluoroethyl)imidazolium cation, 1,2-dimethyl-3-(2-chloro-1,1,2-trifluoroethyl)imidazolium cation, 1,2-dimethyl-3-heptafluoropropylimidazolium cation, 1,2-dimethyl-3-heptafluoroisopropylimidazolium cation, 1,2-dimethyl-3-(1,1,2,3,3,3-hexafluoropropyl)imidazolium cation, 1,2-dimethyl-3-(1,1,2,3,3,4,4,4-octafluorobutyl)imidazolium cation, 1,2-dimethyl-3-(2-trifluoromethoxy-1,1,2-trifluoroethyl)imidazolium cation, and 1,2-dimethyl-3-(2-heptafluoropropoxy-1,1,2-trifluoroethyl)imidazolium cation.

Preferable as the anion ($X^-$) is at least one kind selected from tetrafluoroboric acid anion, hexafluorophosphoric acid anion, bis(trifluoromethanesulfonyl)imidic acid anion, perchloric acid anion, tris(trifluoromethanesulfonyl)carbonic acid anion, trifluoromethanesulfonic acid anion, dicyanamide anion, trifluoroacetic acid anion, organic carboxylic acid anion and halogen ion.

The ion-conducting layer of the present invention comprises the fluorine-containing polymer (I) having functional group and the ionic liquid. The ratio (mass ratio) of the ionic liquid (II) to the fluorine-containing polymer (I) having functional group varies depending on a size of electrolyte ion, material of an electrode and kind of polymer, and the ratio of the ionic liquid (II): the polymer (I) is preferably 1:8 to 4:1. The ratio of (II):(I) is especially preferably 1:4 to 2:1 because satisfactory voltage holding characteristics and optimum values of discharge capacity can be obtained.

Further, other polymer and electrolyte may be added to the ion-conducting layer of the present invention.

Examples of other polymer which can be added are one or two or more kinds of polyvinylidene fluoride, polytetrafluoroethylene, polychlorotrifluoroethylene, polytrifluoroethylene, polyvinyl fluoride, polyethylene, polypropylene, polyisobutene, polymethyl vinyl ketone, polyvinyl chloride, polyvinylidene chloride, polyvinyl alcohol, polypyrrole, polyindole, polyaniline, polythiophene, polyacetylene, polyisothianaphthene, polyfuran, polyselenophene, polytellurophene, polythiophenevinylene, polyparaphenylenevinylene, polyvinylcarboxylate, polycarbonate resin, polyurethane resin, polyester resin, polyimide resin, cellulose resin, polysiloxane, polyvinyl pyridine, starch, polypeptide, polyalkyl methacrylate, polyalkyl acrylate, polyhydroxyalkyl methacrylate, polyhydroxyalkyl acrylate, polyacrylonitrile, polystyrene, perfluorinated polyether, polyethylene oxide, polypropylene oxide, vinylidene fluoride/hexafluoropropylene copolymer, vinylidene fluoride/tetrafluoroethylene copolymer, vinylidene fluoride/chlorotrifluoroethylene copolymer, vinylidene fluoride/hexafluoroacetone copolymer, vinylidene fluoride/pentafluoropropylene copolymer, vinylidene fluoride/(meth)acrylic acid copolymer, vinylidene fluoride/(meth)acrylic acid ester copolymer, ethylene/tetrafluoroethylene copolymer, propylene/tetrafluoroethylene copolymer, tetrafluoroethylene/hexafluoropropylene copolymer, tetrafluoroethylene/perfluoro(methyl vinyl ether) copolymer, tetrafluoroethylene/perfluoro(propyl vinyl ether) copolymer, tetrafluoroethylene/perfluoro-2,2-dimethyl-1,3-dioxole copolymer, tetrafluoroethylene/perfluorosulfonic acid monomer copolymer, ethylene/chlorotrifluoroethylene copolymer, vinylidene fluoride/tetrafluoroethylene/hexafluoropropylene copolymer, vinylidene fluoride/tetrafluoroethylene/perfluoro(methyl vinyl ether) copolymer, vinylidene fluoride/tetrafluoroethylene/perfluoro(propyl vinyl ether) copolymer, vinylidene fluoride/tetrafluoroethylene/pentafluoropropylene copolymer, styrene/hydroxyalkyl (meth)acrylate copolymer, styrene/(meth)acrylic acid ester copolymer, styrene/(meth)acrylic acid copolymer and acrylonitrile/butadiene copolymer. An amount of other polymer is not specifically limited, and is preferably not more than 80% by mass, especially preferably not more than 50% by mass based on 100% by mass of the total amount of the fluorine-containing polymer (I) having functional group and the ionic liquid.

Examples of the electrolyte are halogens such as bromine, iodine and chlorine; Lewis acids such as $BX_3$, $PX_5$, $AsX_5$, $SbX_5$ and $SO_3$ (X is halogen atom); proton acids such as sulfuric acid, nitric acid, phosphoric acid, perchloric acid and tetrafluoroboric acid; transition metal halides such as $FeCl_3$, $MoCl_5$, $SnCl_4$ and $MoF_5$; alkali metal salts such as Li, Na, K and Cs; and alkyl ammonium salts such as tetraethylammonium and tetrabutylammonium. The electrolyte can be added alone or can be added in the form of aqueous electrolytic solution or non-aqueous electrolytic solution.

Examples of a solvent for a non-aqueous electrolytic solution are ethylene carbonate, propylene carbonate, γ-butyrolactone, acetonitrile, dimethylformamide and sulfolane derivative.

The present invention also relates to the composition for forming an ion-conducting layer for an actuator comprising the fluorine-containing polymer (I) having functional group and the ionic liquid (II). The proportions of the components (I) and (II) are as mentioned above.

In preparing this composition, there may be used a solvent such as 4-methylpentan-2-on, 2-pentanone, 2-butanone, cyclohexanone, acetone, ethyl acetate, methyl acetate, propyl acetate, butyl acetate, methanol, ethanol, propanol, isopropyl alcohol, butanol, isobutyl alcohol, sec-butyl alcohol, t-butyl alcohol, cyclohexanol, diethyl ether, t-butyl methyl ether, diisopropyl ether, dibutyl ether, tetrahydrofuran, dioxane, dimethoxymethane, dimethoxyethane, diglyme, triglyme, tetraglyme, N,N-dimethylformamide, N,N-dimethylacetamide, N-methylpyrrolidone, dimethyl sulfoxide, sulfolane, hexamethylphosphoric triamide, benzene, toluene, xylene, chloroform, methylene chloride, dichloroethane, trichloroethane, dichloropentafluoropropane, dichlorofluoroethane, dichlorooctafluorobutane, pentachloropentafluorohexane, dibromotetrafluoroethane, perfluorohexane, perfluoro(butyltetrahydrofuran) or perfluorotributylamine.

The electrode layer for the actuator element of the present invention comprises the above-mentioned fluorine-containing polymer (I) having functional group, the above-mentioned ionic liquid (II) and an electroconductive nano-filler (III).

Examples of the electroconductive nano-filler (III) are electroconductive nano carbon materials and nano particles of electroconductive metals, and at least one of them can be used. Herein "nano-filler" means a filler, in which at least a part thereof has a structure (in the form of particle, sheet, layer, needle, bar, fiber or tube) of nano level (0.1 nm to 1,000 nm). Each of electroconductive nano-fillers is explained below.

(A) Electroconductive Nano Carbon Materials

Among compounds comprising carbon atoms and having a structure of nano level, those having conductivity are raised, and examples thereof are as follows.

(A-1) Fullerene

Fullerene is a carbon molecule having 60 or more carbon atoms and having a structure formed by bonding of carbon atoms in a spherical form.

(A-2) Carbon Nano Ball (Carbon Black)

Carbon nano ball is a black or ivory black powder generated by thermal decomposition of incomplete combustion product of hydrocarbon compound.

(A-3) Carbon Nanofiber

Carbon nanofiber is synthesized by thermal decomposition of carbon sources of gaseous phase by using a metallic catalyst such as iron and cobalt under adequate treating conditions. With respect to a structure of a fibrous carbon, there are known three kinds of orientation of carbon network to a fiber axis, that is, parallel (ribbon type), vertical (platelet type) and inclined (herringbone type).

(A-4) Carbon Nanotube (CNT)

Carbon nanotube is a kind of carbon nanofiber. It is a kind of fullerene in which a six-membered ring network (graphene sheet) is in the form of a single layer or a coaxial tubular multilayer structure. Carbon nanotube having a single layer is called a single-wall nanotube (SWNT), and one having a multilayer structure is called a multi wall nanotube (MWNT). Especially one having two layers is called a double wall nanotube (DWNT).

(A-5) Carbon Nanohorn (CNH)

Carbon nanohorn is a kind of carbon nanofiber. Carbon nanohorn has a carbon structure in which six-membered ring networks (graphene sheet) formed by carbon atoms are usually connected in a form of multi-layer horns.

Examples of these nano carbon materials are those disclosed in Chemical Industry Vol. 56, pp. 50-62 (2005) and Langmuir, Vol. 11, pp. 3, 682-3,866 (1995). Among these nano carbon materials, carbon nanofibers are preferable, and carbon nanotubes are especially preferable.

(B) Nano Particles of Electroconductive Metal

Nano particles of electroconductive metal are metal particles having a particle size of 1 nm to 100 nm. Examples of usable nano particles of metal are nano particles of gold, silver, copper, platinum, palladium, nickel, rhodium, aluminum, tin, zinc, lead, titanium and tantalum, and nano particles of alloy comprising two or more of metals selected from gold, silver, copper, platinum, palladium, nickel, rhodium, aluminum, tin, zinc, lead, titanium and tantalum and carbon, and nano particles of metal are optionally selected according to purpose and applications.

While the electroconductive nano-filler may be optionally selected depending on environment where it is used, electroconductive nano carbon materials, further carbon nanotubes are preferable since they have a large surface area and high conductivity due to quantum effect. Nonlimiting example of suitable carbon nanotube which is put into practical use is HiPco (available from Carbon Nanotechnology, Incorporated) which can be produced in a relatively large scale using carbon monoxide as a starting material.

The ion-conducting layer of the present invention comprises the fluorine-containing polymer (I) having functional group and the ionic liquid. The ratio (mass ratio) of the ionic liquid (II) to the fluorine-containing polymer (I) having functional group varies depending on a size of electrolyte ion, material of an electrode and kind of polymer, and the ratio of the ionic liquid (II): the polymer (I) is preferably 1:8 to 4:1. The ratio of (II):(I) is especially preferably 1:4 to 2:1 because satisfactory voltage holding characteristics and optimum values of discharge capacity can be obtained.

The electrode layer of the present invention comprises the fluorine-containing polymer (I) having functional group, the ionic liquid and the electroconductive nano-filler (III). The ratio (mass ratio) of the ionic liquid (II) to the fluorine-containing polymer (I) having functional group varies depending on a size of electrolyte ion, material of an electrode and kind of polymer, and the ratio of the ionic liquid (II): the polymer (I) is preferably 1:8 to 4:1. The ratio of (II):(I) is especially preferably 1:4 to 2:1 because satisfactory voltage holding characteristics and optimum values of discharge capacity can be obtained. The content of the electroconductive nano-filler (III) is preferably 1 to 60% by mass, more preferably 5 to 40% by mass based on the whole electrode layer from the viewpoint of accumulation capacity.

Further other polymer or an electrolyte may be added to the electrode layer of the present invention.

Example of other polymer which can be added is one or two or more kinds of polyvinylidene fluoride, polytetrafluoroethylene, polychlorotrifluoroethylene, polytrifluoroethylene, polyvinyl fluoride, polyethylene, polypropylene, polyisobutene, polymethyl vinyl ketone, polyvinyl chloride, polyvinylidene chloride, polyvinyl alcohol, polypyrrole, polyindole, polyaniline, polythiophene, polyacetylene, polyisothianaphthene, polyfuran, polyselenophene, polytellurophene, polythiophenevinylene, polyparaphenylenevinylene, polyvinylcarboxylate, polycarbonate resin, polyurethane resin, polyester resin, polyimide resin, cellulose resin, polysiloxane, polyvinyl pyridine, starch, polypeptide, polyalkyl methacrylate, polyalkyl acrylate, polyhydroxyalkyl methacrylate, polyhydroxyalkyl acrylate, polyacrylonitrile, polystyrene, perfluorinated polyether, polyethylene oxide, polypropylene oxide, vinylidene fluoride/hexafluoropropylene copolymer, vinylidene fluoride/tetrafluoroethylene copolymer, vinylidene fluoride/chlorotrifluoroethylene copolymer, vinylidene fluoride/hexafluoroacetone copolymer, vinylidene fluoride/pentafluoropropylene copolymer, vinylidene fluoride/(meth)acrylic acid copolymer, vinylidene fluoride/(meth)acrylic acid ester copolymer, ethylene/tetrafluoroethylene copolymer, propylene/tetrafluoroethylene copolymer, tetrafluoroethylene/hexafluoropropylene copolymer, tetrafluoroethylene/perfluoro(methyl vinyl ether) copolymer, tetrafluoroethylene/perfluoro (propyl vinyl ether) copolymer, tetrafluoroethylene/perfluoro-2,2-dimethyl-1,3-dioxole copolymer, tetrafluoroethylene/perfluorosulfonic acid monomer copolymer, ethylene/chlorotrifluoroethylene copolymer, vinylidene fluoride/tetrafluoroethylene/hexafluoropropylene copolymer, vinylidene fluoride/tetrafluoroethylene/perfluoro(methyl vinyl ether) copolymer, vinylidene fluoride/tetrafluoroethylene/perfluoro(propyl vinyl ether) copolymer, vinylidene fluoride/tetrafluoroethylene/pentafluoropropylene copolymer, styrene/hydroxyalkyl (meth)acrylate copolymer, styrene/(meth)acrylic acid ester copolymer, styrene/(meth)acrylic acid copolymer and acrylonitrile/butadiene copolymer. An amount of other polymer is preferably not more than 80% by mass, especially preferably not more than 50% by mass based on 100% by mass of the total amount of the fluorine-containing polymer (I) having functional group, the ionic liquid (II) and the electroconductive nano-filler (III).

Examples of the electrolyte are halogens such as bromine, iodine and chlorine; Lewis acids such as $BX_3$, $PX_5$, $AsX_5$, $SbX_5$ and $SO_3$ (X is halogen atom); proton acids such as sulfuric acid, nitric acid, phosphoric acid, perchloric acid and tetrafluoroboric acid; transition metal halides such as $FeCl_3$, $MoCl_5$, $SnCl_4$ and $MoF_5$; alkali metal salts such as Li, Na, K and Cs; and alkyl ammonium salts such as tetraethylammonium and tetrabutylammonium. The electrolyte can be added alone or can be added in the form of aqueous electrolytic solution or non-aqueous electrolytic solution.

Examples of a solvent for a non-aqueous electrolytic solution are ethylene carbonate, propylene carbonate, γ-butyrolactone, acetonitrile, dimethylformamide and sulfolane derivative.

The present invention also relates to the composition for forming an electrode layer for an actuator comprising the fluorine-containing polymer (I) having functional group, the ionic liquid (II) and the electroconductive nano-filler (III). The proportions of the components (I), (II) and (III) are as mentioned above.

In preparing this composition, there may be used a solvent such as 4-methylpentan-2-on, 2-pentanone, 2-butanone, cyclohexanone, acetone, ethyl acetate, methyl acetate, propyl acetate, butyl acetate, methanol, ethanol, propanol, isopropyl alcohol, butanol, isobutyl alcohol, sec-butyl alcohol, t-butyl alcohol, cyclohexanol, diethyl ether, t-butyl methyl ether, diisopropyl ether, dibutyl ether, tetrahydrofuran, dioxane, dimethoxymethane, dimethoxyethane, diglyme, triglyme, tetraglyme, N,N-dimethylformamide, N,N-dimethylacetamide, N-methylpyrrolidone, dimethyl sulfoxide, sulfolane, hexamethylphosphoric triamide, benzene, toluene, xylene, chloroform, methylene chloride, dichloroethane, trichloroethane, dichloropentafluoropropane, dichlorofluoroethane, trichlorotrifluoroethane, tetrachlorohexafluoro butane, dichlorooctafluorobutane, pentachloropentafluorohexane, dibromotetrafluoroethane, perfluorohexane, perfluoro(butyltetrahydrofuran) or perfluorotributylamine.

The actuator element of the present invention is formed using the ion-conducting layer and the electrode layer.

Represented examples of the actuator element of the present invention are the actuator element of a three-layer structure comprising the ion-conducting layer of the present invention and at least two electrode layers of the present invention formed on the surfaces of the ion-conducting layer and insulated from each other, in which flection or deformation can be caused by applying an electric potential difference to the electrode layers, and the actuator element of a five-layer structure comprising the ion-conducting layer of the present invention, at least two electrode layers of the present invention formed on the surfaces of the ion-conducting layer and insulated from each other, and the electroconductive layers formed on the surfaces of the electrode layers, in which flection or deformation can be caused by applying an electric potential difference to the electroconductive layers.

Since the actuator element of the present invention is the same as the actuator element disclosed in JP2005-176428A except the materials of each layer, explanation is made below according to the drawings and description of JP2005-176428A.

One embodiment of the actuator element of three-layer structure is as shown in FIG. 1 (diagrammatic cross-sectional view), and the ion-conducting layer 1 is sandwiched between the electrode layers 2a and 2b. The electrode layers 2a and 2b are formed insulated from each other.

In order to obtain an actuator element by forming the electrode layers 2a and 2b on the surfaces of the ion-conducting layer 1, for example, films of each layer are formed in order by a casting method using the respective compositions, a solvent is evaporated and drying is carried out.

It is preferable that thicknesses of the ion-conducting layer 1 and the electrode layers 2 are selected within a range from 10 to 500 μm, further preferably within a range from 50 to 200 μm. In forming each layer using the respective compositions, a spin coating method, a printing method and a spraying method can be employed. Further, an extrusion molding method and an injection molding method can also be used.

Figure 2:
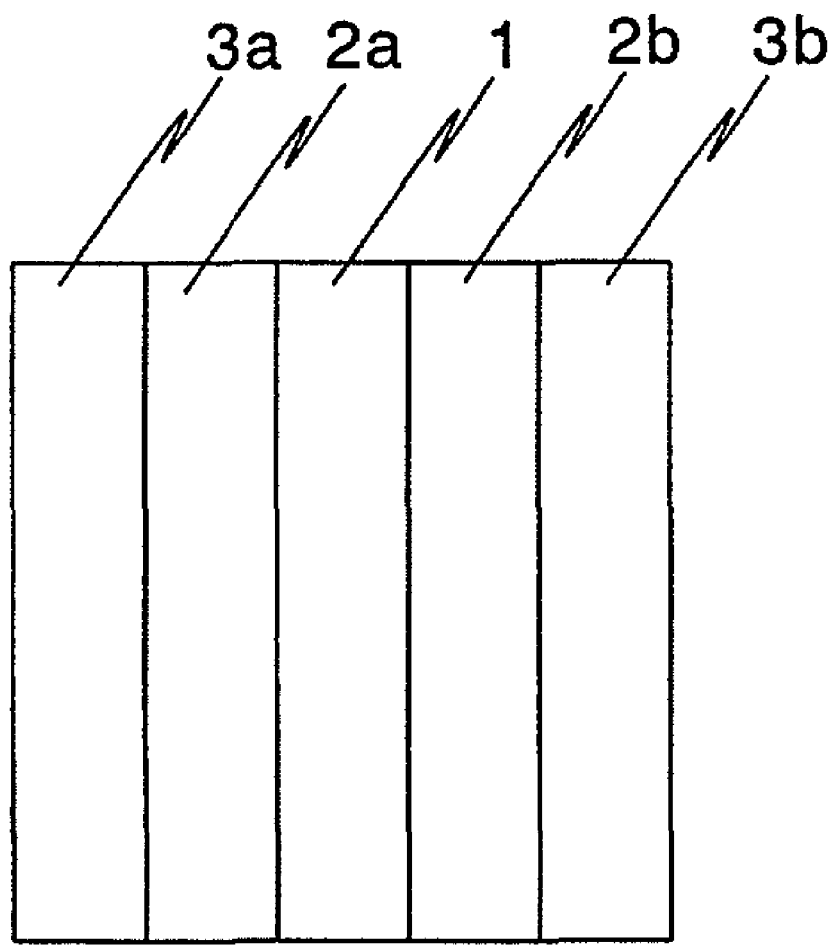
FIG. 2 A diagrammatic cross-sectional view showing a structure of an example of the actuator element (five-layer structure) of the present invention.

One embodiment of the actuator element of five-layer structure is as shown in FIG. 2 (diagrammatic cross-sectional view), and is comprised of five layers comprising the ion-conducting layer 1, the electrode layers 2a and 2b and further the electroconductive layers 3a and 3b formed outside the electrode layers for the purpose of improving surface conductivity of the electrodes.

The electroconductive layers 3a and 3b are formed using electroconductive materials, and examples of electroconductive materials are, for instance, fullerene, carbon black, carbon fiber, carbon nanotube, carbon nanohorn, graphite, activated carbon, conductive double oxides, conductive metal oxides, conductive metal phosphates, conductive metal chalcogenides and conductive metals (at least one metal selected from the group consisting of gold, silver, copper, platinum, palladium, nickel, rhodium, aluminum, tin, zinc, lead, titanium and tantalum or an alloy comprising at least two kinds of these metals).

Also the electroconductive material may be carried on clay minerals such as montmorillonite, bentonite, kaolinite, imogolite, mica, hectorite, fluorohectorite, saponite, beidellite, nontronite, stevensite, vermiculite, halloysite, volkonskoite, suconite, margadite and kenyalite or double hydroxides, or the electroconductive material may be mixed to a conductive resin such as polypyrrole, polyindole, polyaniline, polythiophene or polyacetylene.

For forming the electroconductive layers 3a and 3b, there are a method of jointing a carbon nanotube paper by pressing or casting; a method of jointing a rare metal layer by sputtering or vapor deposition; and a method of coating a carbon paste by spraying or printing. Among them, a method of jointing a rare metal layer by sputtering is more preferable. It is preferable to select a thickness of the electroconductive layer 3 within a range from 10 to 50 nm.

In the thus obtained actuator element, when a direct current voltage of 0.5 to 3 V is applied between the electrodes, a displacement of about 0.5 to 1 time the element length can be obtained within several seconds. This actuator element can be operated flexibly in air or in vacuo.

Figure 3:
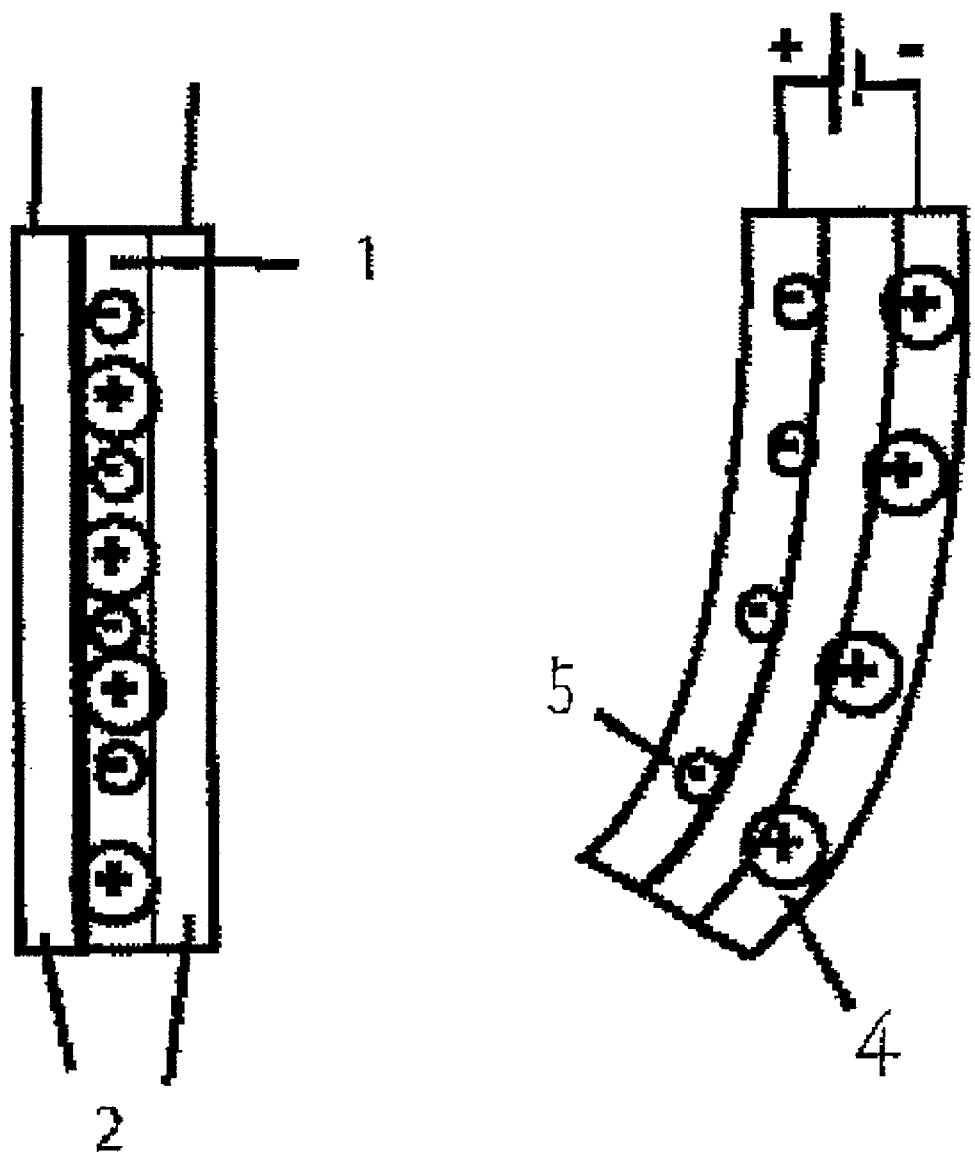
FIG. 3 A view showing an operation principle of the actuator element of the present invention.

As shown in FIG. 3, a theory of operation of such an actuator element is such that when an electric potential difference is applied on the electrode layers 2a and 2b formed on the surfaces of the ion-conducting layer 1 and insulated from each other, an electric double layer is formed on an interface between the ionic liquid phase and the electroconductive nano-filler phase in the electrode layers 2a and 2b, and the electrode layers 2a and 2b undergo expansion and shrinkage due to a resulting interfacial stress. As shown in FIG. 3, it can be considered that the reason why the actuator element bends toward the positive pole is that there is an effect of causing larger expansion of the electroconductive nano-filler at a negative pole side due to a quantum effect, and also in ionic liquids well used currently, an ionic radius of the cation 4 is large and due to its steric effect, a negative pole side undergoes larger expansion. In FIG. 3, numeral 4 represents a cation of the ionic liquid, and numeral 5 represents an anion of the ionic liquid.

According to the actuator element obtained by the above-mentioned method, since an effective area of an interface between the electroconductive nano-filler and the ionic liquid becomes very large, impedance in an interfacial electric double layer becomes small, which contributes to an effect that an electric expansion/contraction effect of the electroconductive nano-filler is effectively utilized. Also from mechanical point of view, adhesion at the interfacial joint becomes satisfactory, and durability of the element is increased. As a result, an element exhibiting quick response in air or in vacuo and having a large displacement and durability can be obtained. In addition, the element has a simple structure, thus making down-sizing easy and can be operated with small power.

The actuator element of the present invention is flexibly operated in air or in vacuo at low voltage with satisfactory durability, and therefore, is suitable as actuators for robots coming in touch with human being and requiring safety (for example, actuators for personal robots such as a home robot, a pet robot and an amusement robot), and also as actuators for robots working in special environments such as in space, in a vacuum chamber and for rescue, robots for medical and welfare uses such as an surgical operation device and muscle suits and micro machine.

Especially in production of materials in vacuum and ultra clean environments for the purpose of obtaining products having high purity, there is an increasing demand for actuators for transportation of samples and for positioning. The actuator element of the present invention using the ionic liquid free from vaporization can be effectively used for processing in vacuum environment as an actuator causing no contamination.

Figure 4:
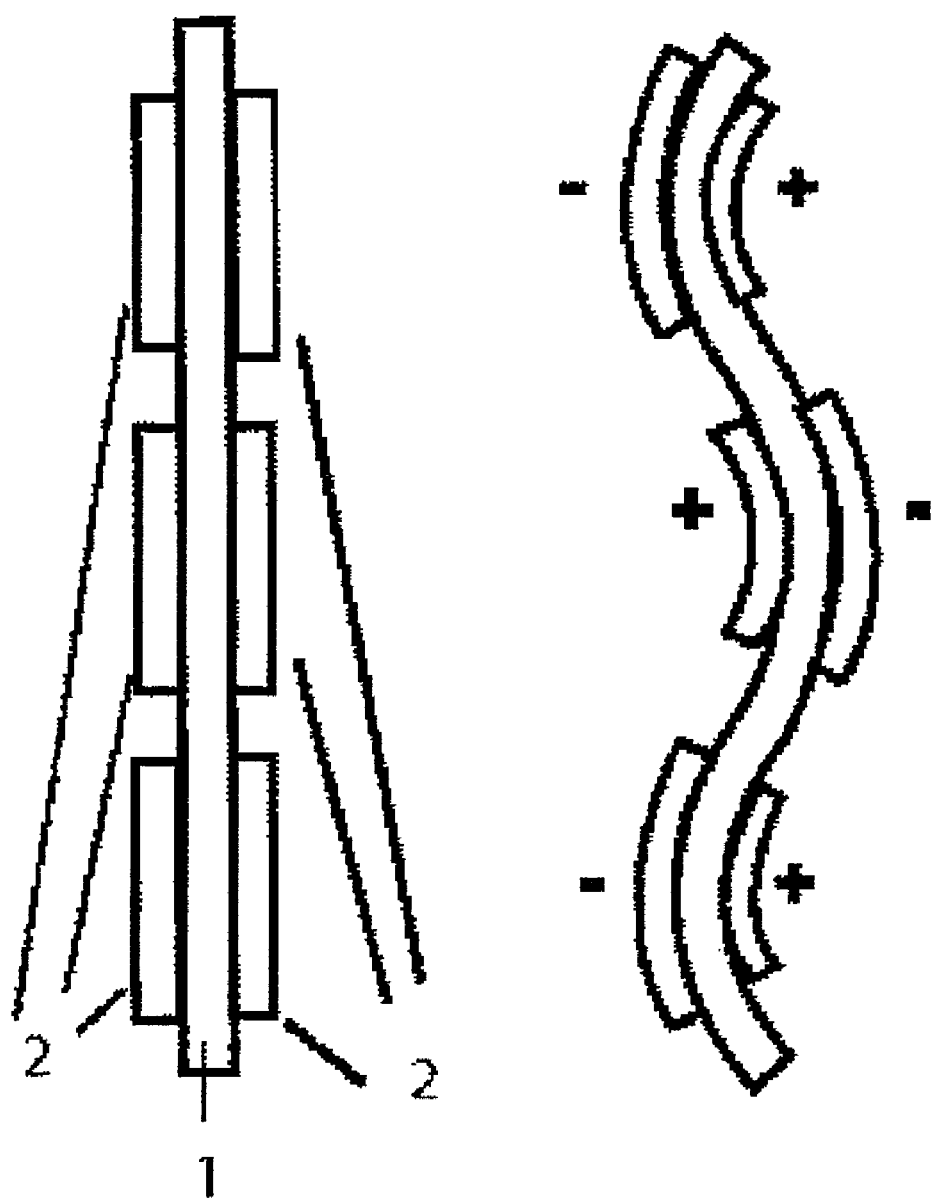
FIG. 4 A diagrammatic view showing other example of the actuator element of the present invention.
Figure 5:
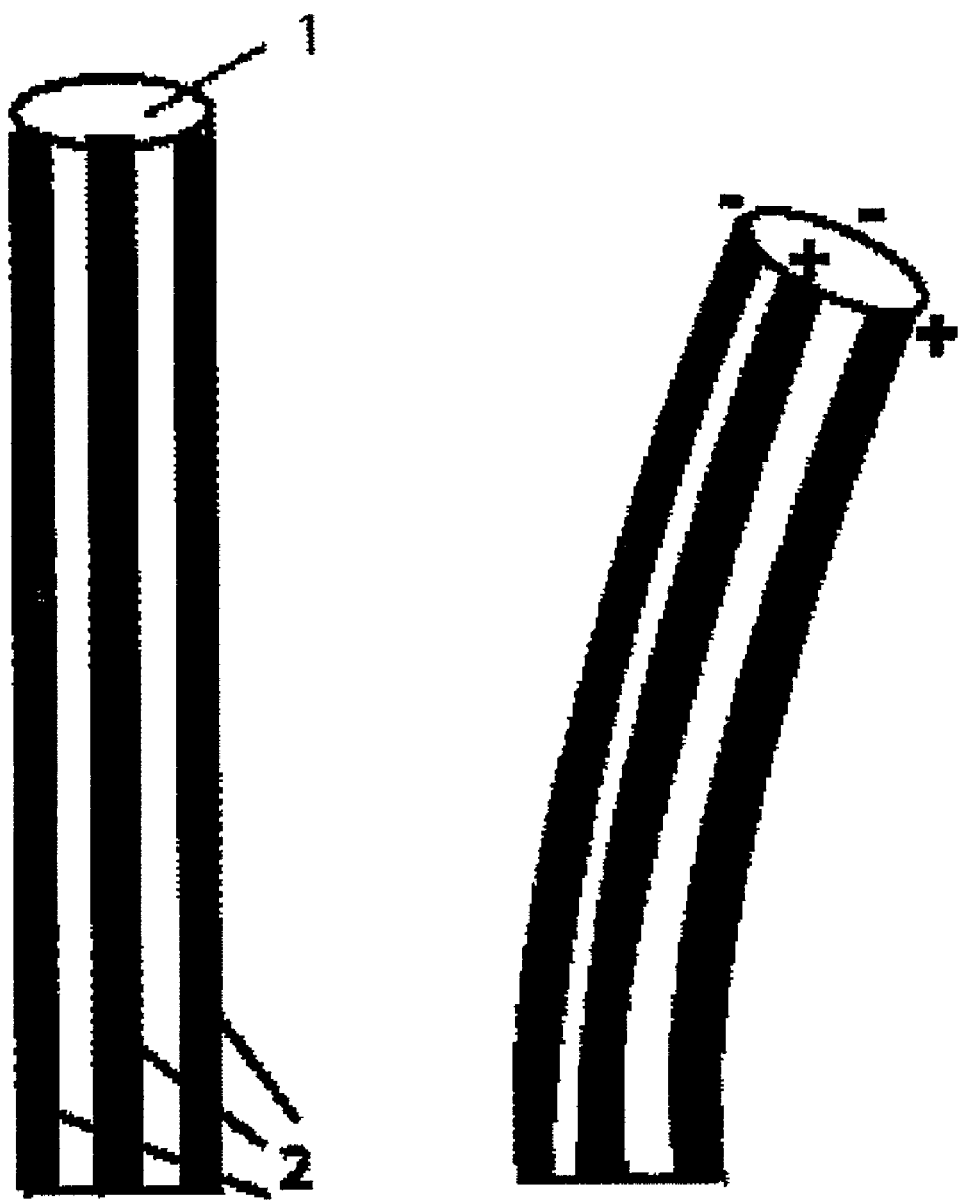
FIG. 5 A diagrammatic view showing other example of the actuator element of the present invention.

While at least two electrode layers need be formed on the surfaces of the ion-conducting layer, as shown in FIG. 4, it is possible to let the actuator make a complicated action by providing a lot of electrode layers 2 on the surfaces of the flat ion-conducting layer 1. Such an actuator element enables transportation by a peristaltic action and a micro manipulator can be realized. Also a shape of the actuator element of the present invention is not limited to a flat shape, and elements having optional shapes can be easily produced. For example, an actuator shown in FIG. 5 is one having four electrode layers 2 on a circumference of the ion-conducting layer 1 in the form of rod having a diameter of about 1 mm. This element makes it possible to realize an actuator which can be inserted in a capillary tube.

EXAMPLE

The present invention is then explained in detail by means of Synthesis Examples, Examples and Comparative Examples, but is not limited to them.

In Examples, butylmethylimidazolium tetrafluoroborate (hereinafter it may be referred to as "BMIBF$_4$") is used as an ionic liquid.

A carbon nanotube used in Examples is a single wall carbon nanotube ("HiPco" available from Carbon Nanotechnology Incorporated) (hereinafter it may be referred to as "SWNT").

A solvent used in Examples is 4-methylpentan-2-on (hereinafter it may be referred to as "MIBK").

A carbon nanotube paper used in Examples is obtained in such a manner as explained below. Namely, a single wall carbon nanotube is dispersed in an aqueous solution of Triton X-100 (0.5% by volume) having a pH value of 10 while applying ultrasonic wave for two hours in an ultrasonic washer (0.6 mg/ml). 50 ml of the resulting dispersion is subjected to suction filtration with a polytetrafluoroethylene (PTFE) filter, followed by washing with large amounts of water and methanol. The obtained product is air-dried and peeled from the filter, and a carbon nanotube paper (having a thickness of about 50 μm) made of only self-supporting carbon nanotubes entangled with each other is obtained. A surface resistance measured with a tester is not more than several ohms at a distance of about 1 cm.

Figure 6:
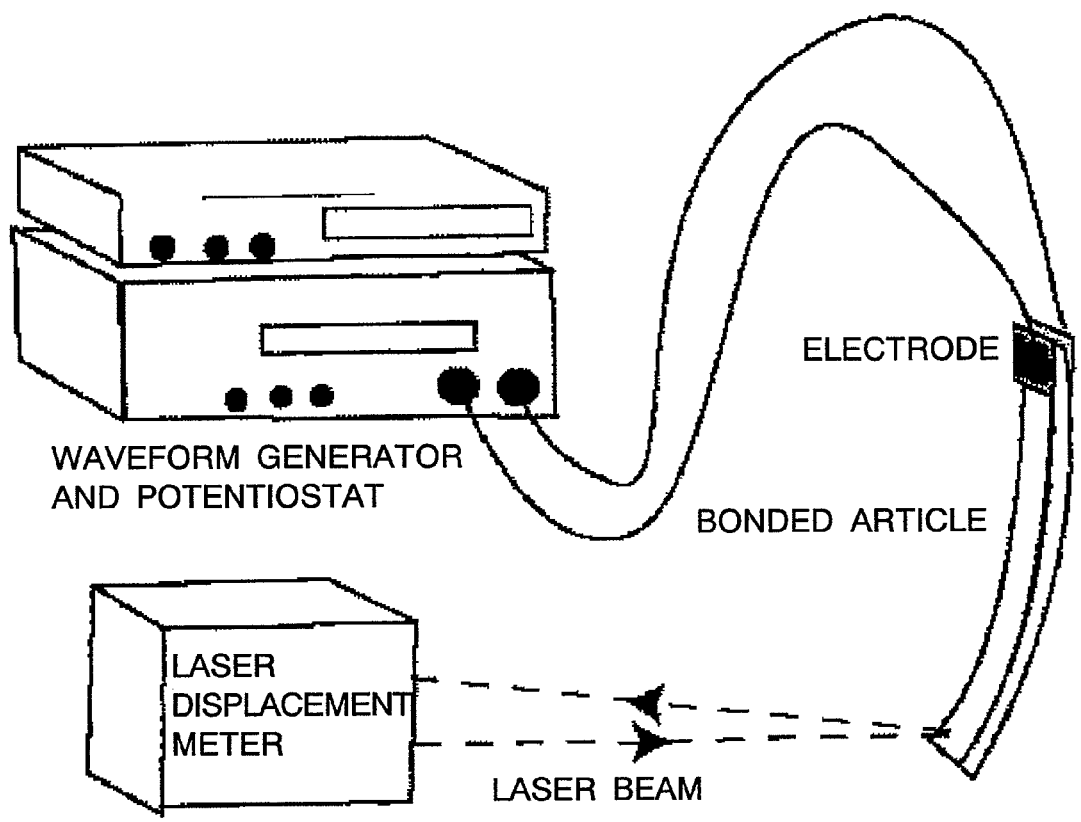
FIG. 6 A diagrammatic view explaining displacement measuring equipment used in Examples of the present invention.

Evaluation of responsivity is made by cutting three-layer films or five-layer films obtained in Examples into strips of 1 mm wide×15 mm long, holding a portion of 3 mm from an end of the film with a holder having electrodes as shown in FIG. 6, applying a voltage in air and measuring a displacement at a point 10 mm apart from the fixed end using a laser displacement meter. A voltage and a current are measured simultaneously.

Synthesis Example 1

Synthesis of a Copolymer of Fluorine-Containing Allyl Ether Having OH Group, VDF and HFP Into a 300 ml stainless steel autoclave were poured 1H,1H,9H,9H-perfluoro-2,5-dimethyl-3,6-dioxa-8-nonen-1-ol: $CH_2$=$CFCF_2OCF(CF_3)CF_2OCF(CF_3)CH_2OH$ (7.75 g, 19.0 mmol), 1,1-dichloro-1-fluoroethane (300 g) and 50% by weight methanol solution of bis(normalpropyl)peroxydicarbonate (2.41 g), followed by cooling with a dry ice/methanol solution, and the inside of a system was replaced by nitrogen gas three times. Then thereto were introduced vinylidene fluoride (VDF) (12.1 g, 190 mmol) and hexafluoropropylene (HFP) (12.4 g, 84.0 mmol), and the temperature of the mixture was increased to 40° C., followed by 12-hour stirring. As the reaction proceeded, a gage pressure of 0.48 MPa inside the system before starting of the reaction decreased to 0.17 MPa 12 hours after.

At this point of time, unreacted monomer was released, and a precipitated solid product was taken out and dissolved in acetone, followed by re-precipitation with a solvent mixture of hexane and toluene (50/50) to separate a copolymer. This copolymer was subjected to vacuum drying until a constant weight was reached. Thus a copolymer (16.9 g) was obtained.

According to $^1$H-NMR analysis and $^{19}$F-NMR analysis, this copolymer was one comprising VDF, HFP and fluorine-containing allyl ether having OH group in a percent by mole ratio of 87/5/8. A number average molecular weight of the copolymer measured by GPC analysis using THF as a solvent was 12,000, and a weight average molecular weight was 18,000.

Synthesis Example 2

Synthesis of a Copolymer of Fluorine-Containing Allyl Ether Having OH Group, VDF and HFP Into a 300 ml stainless steel autoclave were poured 1H,1H,9H,9H-perfluoro-2,5-dimethyl-3,6-dioxa-8-nonen-1-ol: $CH_2$=$CFCF_2OCF(CF_3)CF_2OCF(CF_3)CH_2OH$ (7.75 g, 19.0 mmol), 1,1-dichloro-1-fluoroethane (300 g) and 50% by weight methanol solution of bis(normalpropyl)peroxydicarbonate (2.41 g), followed by cooling with a dry ice/methanol solution, and the inside of a system was replaced by nitrogen gas three times. Then thereto were introduced VDF (10.6 g, 165 mmol) and HFP (12.6 g, 84.2 mmol), and the temperature of the mixture was increased to 40° C., followed by 12-hour stirring. As the reaction proceeded, a gage pressure of 0.43 MPa inside the system before starting of the reaction decreased to 0.16 MPa 12 hours after.

At this point of time, unreacted monomer was released, and a precipitated solid product was taken out and dissolved in acetone, followed by re-precipitation with a solvent mixture of hexane and toluene (50/50) to separate a copolymer. This copolymer was subjected to vacuum drying until a constant weight was reached. Thus a copolymer (16.9 g) was obtained.

According to $^1$H-NMR analysis and $^{19}$F-NMR analysis, this copolymer was one comprising VDF, HFP and fluorine-containing allyl ether having OH group in a percent by mole ratio of 82/11/7. A number average molecular weight of the copolymer measured by GPC analysis using THF as a solvent was 12,000, and a weight average molecular weight was 18,000.

Synthesis Example 3

Synthesis of a Copolymer of Fluorine-Containing Allyl Ether Having CO₂H Group, VDF and HFP Into a 300 ml stainless steel autoclave were poured 9H,9H-perfluoro-2,5-dimethyl-3,6-dioxa-8-nonenoic acid: $CH_2=CFCF_2OCF(CF_3)CF_2OCF(CF_3)CO_2H$ (8.00 g, 19.0 mmol), 1,1-dichloro-1-fluoroethane (300 g) and 50% by weight methanol solution of bis(normalpropyl)peroxydicarbonate (2.41 g), followed by cooling with a dry ice/methanol solution, and the inside of a system was replaced by nitrogen gas three times. Then thereto were introduced VDF (12.1 g, 190 mmol) and HFP (12.4 g, 84.0 mmol), and the temperature of the mixture was increased to 40° C., followed by 12-hour stirring. As the reaction proceeded, a gage pressure of 0.47 MPa inside the system before starting of the reaction decreased to 0.15 MPa 12 hours after.

At this point of time, unreacted monomer was released, and a precipitated solid product was taken out and dissolved in acetone, followed by re-precipitation with a solvent mixture of hexane and toluene (50/50) to separate a copolymer. This copolymer was subjected to vacuum drying until a constant weight was reached. Thus a copolymer (18.3 g) was obtained.

According to $^1$H-NMR analysis and $^{19}$F-NMR analysis, this copolymer was one comprising VDF, HFP and fluorine-containing allyl ether having CO₂H group in a percent by mole ratio of 88/5/7. A number average molecular weight of the copolymer measured by GPC analysis using THF as a solvent was 11,000, and a weight average molecular weight was 16,000.

Synthesis Example 4

Synthesis of a Copolymer of Fluorine-Containing Allyl Ether Having Methacryloyl Group, VDF and HFP Into a 200 ml three-necked flask were poured MIBK (100 ml), 10.0 g of the copolymer comprising VDF, HFP and fluorine-containing allyl ether having OH group prepared in Synthesis Example 1 and pyridine (1.44 g, 18.2 mmol), followed by cooling to 3° C. Then thereto was added dropwise methacryloyl chloride (0.95 g, 9.1 mmol) in a stream of nitrogen gas. After completion of the addition, the inside temperature was increased to room temperature, followed by 6-hour stirring.

The MIBK solution after the reaction was poured into a dropping funnel and subjected to washing with ion-exchange water, 2% hydrochloric acid solution, 5% NaCl solution and further ion-exchange water. After separation of an organic layer, drying with anhydrous magnesium sulfate was carried out, and after filtration, the solvent was removed under reduced pressure. This polymer was dissolved again in acetone, followed by re-precipitation with hexane to separate a copolymer. This copolymer was subjected to vacuum drying at room temperature until a constant weight was reached. Thus a copolymer (9.3 g) was obtained.

According to $^{19}$F-NMR analysis of this MEK solution, a content of methacryloyl group was 89% by mole. According to IR analysis, absorption of a carbon-carbon double bond was observed at 1,660 cm$^{-1}$, and absorption of C=O was observed at 1,770 cm$^{-1}$.

Comparative Example 1

Film of Three-Layer Structure Comprising Ionic Liquid (BMIBF₄), VDF/HFP Copolymer and Carbon Nanotube (1) Preparation of a Gel Composition Comprising a Single Wall Carbon Nanotube (SWNT) and BMIBF₄:

SWNT (63 mg) and BMIBF₄ (245 mg) were kneaded for 15 minutes to prepare a composition in the form of gel comprising 21% by weight of SWNT. By the kneading, the ionic liquid was formed into gel by the carbon nanotube.

(2) Preparation of a Film of Three-Layer Structure by Sandwiching a VDF/HFP Copolymer of an Ionic Liquid Between SWNTs:

The composition (160 mg) in the form of gel comprising SWNT prepared in (1) above, a VDF/HFP copolymer (VDF:HFP=85:15, 80 mg) and MIBK (1.5 ml) were mixed while heating at 70° to 80° C. to obtain a gel composition constituting the first layer (electrode layer) and the third layer (electrode layer). A gel composition for forming the second layer (ion-conducting layer) sandwiched therebetween was prepared by mixing BMIBF₄ (163 mg), a VDF/HFP copolymer (VDF:HFP=85:15, 82 mg) and MIBK (0.6 ml) while heating at 70° to 80° C. The gel composition for the first layer was poured onto a substrate, and leveled using a spacer as a guide. After drying for several minutes, another spacer was overlaid thereon and the gel composition for the second layer was poured and leveled. The third layer was overlaid in the same manner as above, and after air drying for twenty-four hours, vacuum drying was carried out to produce a film of three-layer structure.

(3) Evaluation of Responsivity of a Film of Three-Layer Structure:

Evaluation of responsivity was conducted using a laser displacement meter according to the method explained above. Table 1 shows a value of an applied 0.1 Hz square-wave voltage and a response displacement at that time.

TABLE 1

| | Voltage (V) | | | |
|---|---|---|---|---|
| | 2 | 3 | 4 | 5 |
| Displacement (mm) | 0.16 | 0.33 | 0.65 | 1.07 |

Example 1

Film of Three-Layer Structure Comprising Ionic Liquid (BMIBF₄), Copolymer of VDF, HFP and Fluorine-Containing Allyl Ether Having OH group and carbon nanotube (1) Preparation of a Gel Composition Comprising a Single Wall Carbon Nanotube (SWNT) and BMIMF₄:

SWNT (63 mg) and BMIBF₄ (245 mg) were kneaded for 15 minutes to prepare a composition in the form of gel comprising 21% by weight of SWNT. By the kneading, the ionic liquid was formed into gel by the carbon nanotube.

(2) Preparation of a Film of Three-Layer Structure by Sandwiching a VDF/HFP/OH Group-Containing Fluorine-Containing Allyl Ether Copolymer of an Ionic Liquid Between SWNTs:

The composition (160 mg) in the form of gel comprising SWNT prepared in (1) above, the copolymer comprising VDF, HFP and OH group-containing fluorine-containing allyl ether (VDF:HFP:OH group-containing fluorine-containing allyl ether=87:5:8, 80 mg) prepared in Synthesis Example 1 and MIBK (1.5 ml) were mixed while heating at 70° to 80° C. to obtain a gel composition constituting the first layer (electrode layer) and the third layer (electrode layer). A gel composition for forming the second layer (ion-conducting layer) sandwiched therebetween was prepared by mixing $BMIBF_4$ (163 mg), the VDF/HFP/OH group-containing fluorine-containing allyl ether copolymer (VDF:HFP:OH group-containing fluorine-containing allyl ether=87:5:8, 82 mg) prepared in Synthesis Example 1 and MIBK (0.6 ml) while heating at 70° to 80° C. The gel composition for the first layer was poured onto a substrate, and leveled using a spacer as a guide. After drying for several minutes, another spacer was overlaid thereon and the gel composition for the second layer was poured and leveled. The third layer was overlaid in the same manner as above, and after air drying for twenty-four hours, vacuum drying was carried out to produce a film of three-layer structure.

(3) Evaluation of Responsivity of a Film of Three-Layer Structure:

Evaluation of responsivity was conducted using a laser displacement meter according to the method explained above. Table 2 shows a value of an applied 0.1 Hz square-wave voltage and a response displacement at that time.

TABLE 2

|  | Voltage (V) | | | |
| --- | --- | --- | --- | --- |
|  | 2 | 3 | 4 | 5 |
| Displacement (mm) | 0.18 | 0.38 | 0.72 | 1.36 |

Example 2

Film of Three-Layer Structure Comprising Ionic Liquid ($BMIBF_4$), Copolymer of VDF, HFP and Fluorine-Containing Allyl Ether Having OH Group and Carbon Nanotube (1) Preparation of a Gel Composition Comprising a Single Wall Carbon Nanotube (SWNT) and $BMIBF_4$:

SWNT (63 mg) and $BMIBF_4$ (245 mg) were kneaded for 15 minutes to prepare a composition in the form of gel comprising 21% by weight of SWNT. By the kneading, the ionic liquid was formed into gel by the carbon nanotube.

(2) Preparation of a Film of Three-Layer Structure by Sandwiching a VDF/HFP/OH Group-Containing Fluorine-Containing Allyl Ether Copolymer of the Ionic Liquid Between SWNTs:

The composition (160 mg) in the form of gel comprising SWNT prepared in (1) above, the copolymer comprising VDF, HFP and OH group-containing fluorine-containing allyl ether (VDF:HFP:OH group-containing fluorine-containing allyl ether=82:11:7, 80 mg) prepared in Synthesis Example 2 and MIBK (1.5 ml) were mixed while heating at 70° to 80° C. to obtain a gel composition constituting the first layer (electrode layer) and the third layer (electrode layer). A gel composition for forming the second layer (ion-conducting layer) sandwiched therebetween was prepared by mixing $BMIBF_4$ (163 mg), the VDF/HFP/OH group-containing fluorine-containing allyl ether copolymer (VDF:HFP:OH group-containing fluorine-containing allyl ether=81:12:7, 82 mg) prepared in Synthesis Example 2 and MIBK (0.6 ml) while heating at 70° to 80° C. The gel composition for the first layer was poured onto a substrate, and leveled using a spacer as a guide. After drying for several minutes, another spacer was overlaid thereon and the gel composition for the second layer was poured and leveled. The third layer was overlaid in the same manner as above, and after air drying for twenty-four hours, vacuum drying was carried out to produce a film of three-layer structure.

(3) Evaluation of Responsivity of a Film of Three-Layer Structure:

Evaluation of responsivity was conducted using a laser displacement meter according to the method explained above. Table 3 shows a value of an applied 0.1 Hz square-wave voltage and a response displacement at that time.

TABLE 3

|  | Voltage (V) | | | |
| --- | --- | --- | --- | --- |
|  | 2 | 3 | 4 | 5 |
| Displacement (mm) | 0.20 | 0.39 | 0.74 | 1.32 |

Example 3

Film of Three-Layer Structure Comprising Ionic Liquid (1-(1,1,2,3,3,3-hexafluoropropyl)-3-methylimidazoliumbistrifluoromethylsulfonimide), Copolymer of VDF, HFP and Fluorine-Containing Allyl Ether Having OH Group and Carbon Nanotube (1) Preparation of a Gel Composition Comprising a Single Wall Carbon Nanotube (SWNT) and 1-(1,1,2,3,3,3-hexafluoropropyl)-3-methylimidazoliumbistrifluoromethylsulfonimide:

SWNT (63 mg) and 1-(1,1,2,3,3,3-hexafluoropropyl)-3-methylimidazoliumbistrifluoromethylsulfonimide (245 mg) were kneaded for 15 minutes to prepare a composition in the form of gel comprising 21% by weight of SWNT. By the kneading, the ionic liquid was formed into gel by the carbon nanotube.

(2) Preparation of a Film of Three-Layer Structure by Sandwiching VDF/HFP/OH Group-Containing Fluorine-Containing Allyl Ether Copolymer of an Ionic Liquid Between SWNTs:

The composition (160 mg) in the form of gel comprising SWNT prepared in (1) above, the copolymer comprising VDF, HFP and OH group-containing fluorine-containing allyl ether (VDF:HFP:OH group-containing fluorine-containing allyl ether=87:5:8, 80 mg) prepared in Synthesis Example 1 and MIBK (1.5 ml) were mixed while heating at 70° to 80° C. to obtain a gel composition constituting the first layer (electrode layer) and the third layer (electrode layer). A gel composition for forming the second layer (ion-conducting layer) sandwiched therebetween was prepared by mixing 1-(1,1,2,3,3,3-hexafluoropropyl)-3-methylimidazoliumbistrifluoromethylsulfonimide (163 mg), the VDF/HFP/OH group-containing fluorine-containing allyl ether copolymer (VDF:HFP:OH group-containing fluorine-containing allyl ether=87:5:8, 82 mg) prepared in Synthesis Example 1 and MIBK (0.6 ml) while heating at 70° to 80° C. The gel composition for the first layer was poured onto a substrate, and leveled using a spacer as a guide. After drying for several minutes, another spacer was overlaid thereon and the gel composition for the second layer was poured and leveled. The third layer was overlaid in the same manner as above, and after air drying for twenty-four hours, vacuum drying was carried out to produce a film of three-layer structure.

(3) Evaluation of Responsivity of a Film of Three-Layer Structure:

Evaluation of responsivity was conducted using a laser displacement meter according to the method explained above. Table 4 shows a value of an applied 0.1 Hz square-wave voltage and a response displacement at that time.

TABLE 4

|  | Voltage (V) | | | |
| --- | --- | --- | --- | --- |
|  | 2 | 3 | 4 | 5 |
| Displacement (mm) | 0.20 | 0.39 | 0.78 | 1.51 |

Example 4

Film of Three-Layer Structure Comprising Ionic Liquid (BMIBF$_4$), Copolymer of VDF, HFP and Fluorine-Containing Allyl Ether Having CO$_2$H Group and Carbon Nanotube (1) Preparation of a Composition Comprising a Single Wall Carbon Nanotube (SWNT) and BMIBF$_4$:

SWNT (63 mg) and BMIBF$_4$ (245 mg) were kneaded for 15 minutes to prepare a composition in the form of gel comprising 21% by weight of SWNT. By the kneading, the ionic liquid was formed into gel by the carbon nanotube.

(2) Preparation of a Film of Three-Layer Structure by Sandwiching the VDF/HFP/CO$_2$H Group-Containing Fluorine-Containing Allyl Ether Copolymer of an Ionic Liquid Between SWNTs:

The composition (160 mg) in the form of gel comprising SWNT prepared in (1) above, the copolymer comprising VDF, HFP and CO$_2$H group-containing fluorine-containing allyl ether (VDF:HFP:CO$_2$H group-containing fluorine-containing allyl ether=87:5:8, 80 mg) prepared in Synthesis Example 3 and MIBK (1.5 ml) were mixed while heating at 70° to 80° C. to obtain a gel composition constituting the first layer (electrode layer) and the third layer (electrode layer). A gel composition for forming the second layer (ion-conducting layer) sandwiched therebetween was prepared by mixing BMIBF$_4$ (163 mg), the VDF/HFP/CO$_2$H group-containing fluorine-containing allyl ether copolymer (VDF:HFP:CO$_2$H group-containing fluorine-containing allyl ether=88:5:7, 82 mg) prepared in Synthesis Example 3 and MIBK (0.6 ml) while heating at 70° to 80° C. The gel composition for the first layer was poured onto a substrate, and leveled using a spacer as a guide. After drying for several minutes, another spacer was overlaid thereon and the gel composition for the second layer was poured and leveled. The third layer was overlaid in the same manner as above, and after air drying for twenty-four hours, vacuum drying was carried out to produce a film of three-layer structure.

(3) Evaluation of Responsivity of a Film of Three-Layer Structure:

Evaluation of responsivity was conducted using a laser displacement meter according to the method explained above. Table 5 shows a value of an applied 0.1 Hz square-wave voltage and a response displacement at that time.

TABLE 5

|  | Voltage (V) | | | |
| --- | --- | --- | --- | --- |
|  | 2 | 3 | 4 | 5 |
| Displacement (mm) | 0.15 | 0.35 | 0.71 | 1.19 |

Example 5

Film of Three-Layer Structure Comprising Ionic Liquid (BMIBF$_4$), Copolymer of VDF, HFP and Fluorine-Containing Allyl Ether Having Methacryloyl Group and Carbon Nanotube (1) Preparation of a Gel Composition Comprising a Single Wall Carbon Nanotube (SWNT) and BMIBF$_4$:

SWNT (63 mg) and BMIBF$_4$ (245 mg) were kneaded for 15 minutes to prepare a composition in the form of gel comprising 21% by weight of SWNT. By the kneading, the ionic liquid was formed into gel by the carbon nanotube.

(2) Preparation of a Film of Three-Layer Structure by Sandwiching a VDF/HFP/methacryloyl Group-Containing Fluorine-Containing Allyl Ether Copolymer of an Ionic Liquid Prepared in Synthesis Example 4 Between Gel Compositions of SWNT:

The composition of SWNT (160 mg) in the form of gel prepared in (1) above, the copolymer comprising VDF, HFP and methacryloyl group-containing fluorine-containing allyl ether (VDF:HFP:methacryloyl group-containing fluorine-containing allyl ether=87:5:8, 80 mg) prepared in Synthesis Example 4, 2-hydroxy-2-methylpropiophenone (2.0 mg) as an active energy curing initiator and MIBK (1.5 ml) were mixed while heating at 70° to 80° C. to obtain a gel composition constituting the first layer (electrode layer) and the third layer (electrode layer). A gel composition for forming the second layer (ion-conducting layer) sandwiched therebetween was prepared by mixing BMIBF$_4$ (163 mg), a methacryl-modified copolymer gel (VDF:HFP:methacryloyl group-containing fluorine-containing allyl ether:OH group-containing fluorine-containing allyl ether=87:5:7:1, 82 mg) of the VDF/HFP/OH group-containing fluorine-containing allyl ether copolymer prepared in Synthesis Example 4, 2-hydroxy-2-methylpropiophenone (2.0 mg) as an active energy curing initiator and MIBK (0.6 ml) while heating at 70° to 80° C. The gel composition for the first layer was poured onto a substrate, and leveled using a spacer as a guide. After drying for several minutes, photo irradiation was carried out at an intensity of 1,500 mJ/cm$^2$ at room temperature and another spacer was overlaid thereon. Then the gel composition for the second layer was poured and leveled, and photo irradiation was carried out at an intensity of 1,500 mJ/cm$^2$ at room temperature. The third layer was overlaid in the same manner as above, and after air drying for twenty-four hours, vacuum drying was carried out to produce a film of three-layer structure.

(3) Evaluation of Responsivity of a Film of Three-Layer Structure:

Evaluation of responsivity was conducted using a laser displacement meter according to the method explained above. Table 6 shows a value of an applied 0.1 Hz square-wave voltage and a response displacement at that time.

TABLE 6

| | Voltage (V) | | | |
| --- | --- | --- | --- | --- |
| | 2 | 3 | 4 | 5 |
| Displacement (mm) | 0.23 | 0.43 | 0.84 | 1.59 |

Comparative Example 2

Film of Five-Layer Structure Obtained by Press Jointing Carbon Nanotube Papers to Film of Three-Layer Structure Comprising Ionic Liquid (BMIBF$_4$), VDF/HFP Copolymer and Carbon Nanotube (1) Preparation of a Gel Composition Comprising a Single Wall Carbon Nanotube (SWNT) and BMIBF$_4$:

SWNT (63 mg) and BMIBF$_4$ (245 mg) were kneaded for 15 minutes to prepare a composition in the form of gel comprising 21% by weight of SWNT.

(2) Preparation of a Film of Three-Layer Structure by Sandwiching a VDF/HFP Copolymer of an Ionic Liquid Between SWNTs:

A film of three-layer structure was produced in the same manner as in Comparative Example 1. For the first layer (electrode layer) and the third layer (electrode layer), the SWNT gel (160 mg) prepared in (1) above, a VDF/HFP copolymer (VDF:HFP=88:12, 80 mg) and MIBK (1.5 ml) were mixed. For the second layer (ion-conducting layer) sandwiched therebetween, BMIBF$_4$ (163 mg), a VDF/HFP copolymer (VDF:HFP=88:12, 82 mg) and MIBK (0.6 ml) were mixed.

(3) Preparation of a Film of Five-Layer Structure

Carbon nanotube papers (electroconductive layers) were jointed to the film of three-layer structure prepared in (2) above from the both sides of the film by using a press.

(4) Evaluation of Responsivity of a Film of Five-Layer Structure:

Evaluation of responsivity was conducted in the same manner as in Example 1. Table 7 shows a value of an applied 0.1 Hz square-wave voltage and a response displacement at that time.

TABLE 7

| | Voltage (V) | | | |
| --- | --- | --- | --- | --- |
| | 2 | 3 | 4 | 5 |
| Displacement (mm) | 0.28 | 0.76 | 1.16 | 1.80 |

Example 6

Film of Five-Layer Structure Obtained by Press-Jointing Carbon Nanotube Papers to Film of Three-Layer Structure Comprising Ionic Liquid (BMIBF$_4$), VDF/HFP/OH Group-Containing Fluorine-Containing Allyl Ether Copolymer and Nanotube (1) Preparation of a Gel Composition Comprising a Single Wall Carbon Nanotube (SWNT) and BMIBF$_4$:

SWNT (63 mg) and BMIBF$_4$ (245 mg) were kneaded for 15 minutes to prepare a composition in the form of gel comprising 21% by weight of SWNT.

(2) Preparation of a Film of Three-Layer Structure by Sandwiching the VDF/HFP/OH Group-Containing Fluorine-Containing Allyl Ether Copolymer of an Ionic Liquid Prepared in Synthesis Example 2 Between SWNTs:

A film of three-layer structure was produced in the same manner as in Example 1. For the first layer (electrode layer) and the third layer (electrode layer), the SWNT gel (160 mg) prepared in (1) above, the VDF/HFP/OH group-containing fluorine-containing allyl ether copolymer (VDF:HFP:OH group-containing fluorine-containing allyl ether=82:11:7, 80 mg) prepared in Synthesis Example 2 and MIBK (1.5 ml) were mixed. For the second layer (ion-conducting layer) sandwiched therebetween, BMIBF$_4$ (163 mg), the VDF/HFP/OH group-containing fluorine-containing allyl ether copolymer (VDF:HFP:OH group-containing fluorine-containing allyl ether=82:11:7, 82 mg) prepared in Synthesis Example 2 and MIBK (0.6 ml) were mixed.

(3) Preparation of a Film of Five-Layer Structure

Carbon nanotube papers (electroconductive layers) were jointed to the film of the three-layer structure prepared in (2) above from the both sides of the film by using a press.

(4) Evaluation of Responsivity of a Film of Five-Layer Structure:

Evaluation of responsivity was conducted in the same manner as in Example 1. Table 8 shows a value (peak-to-peak) of an applied 0.1 Hz square-wave voltage and a response displacement (peak-to-peak) at that time.

TABLE 8

| | Voltage (V) | | | |
| --- | --- | --- | --- | --- |
| | 2 | 3 | 4 | 5 |
| Displacement (mm) | 0.35 | 0.93 | 1.40 | 2.29 |

Example 7

Film of Five-Layer Structure Obtained by Press Jointing Carbon Nanotube Papers to Film of Three-Layer Structure Comprising Ionic Liquid (BMIBF$_4$), VDF/HFP/OH Group-Containing Fluorine-Containing Allyl Ether Copolymer and Carbon Nanotube (1) Preparation of a Gel Composition Comprising a Single Wall Carbon Nanotube (SWNT) and BMIBF$_4$:

SWNT (63 mg) and BMIBF$_4$ (245 mg) were kneaded for 15 minutes to prepare a composition in the form of gel comprising 21% by weight of SWNT.

(2) Preparation of a Film of Three-Layer Structure by Sandwiching the VDF/HFP/OH Group-Containing Fluorine-Containing Allyl Ether Copolymer of an Ionic Liquid Prepared in Synthesis Example 2 Between SWNTs:

A film of three-layer structure was produced in the same manner as in Example 1. For the first layer (electrode layer) and the third layer (electrode layer), the gel composition of SWNT (160 mg) prepared in (1) above, the VDF/HFP/OH group-containing fluorine-containing allyl ether copolymer (VDF:HFP:OH group-containing fluorine-containing allyl ether=88:5:7, 80 mg) prepared in Synthesis Example 2 and MIBK (1.5 ml) were mixed. For the second layer (ion-conducting layer) sandwiched therebetween, BMIBF$_4$ (163 mg), the VDF/HFP/OH group-containing fluorine-containing allyl ether copolymer (VDF:HFP:OH group-containing fluorine-containing allyl ether=88:5:7, 82 mg) prepared in Synthesis Example 2 and MIBK (0.6 ml) were mixed.

(3) Preparation of a Film of Five-Layer Structure

Carbon nanotube papers (electroconductive layers) were jointed to the film of the three-layer structure prepared in (2) above from the both sides of the film by using a press.

(4) Evaluation of Responsivity of a Film of Five-Layer Structure:

Evaluation of responsivity was conducted in the same manner as in Example 1. Table 9 shows a value (peak-to-peak) of an applied 0.1 Hz square-wave voltage and a response displacement (peak-to-peak) at that time.

TABLE 9

|  | Voltage (V) | | | |
| --- | --- | --- | --- | --- |
|  | 2 | 3 | 4 | 5 |
| Displacement (mm) | 0.33 | 0.90 | 1.37 | 2.00 |

Comparative Example 3

Film of Five-Layer Structure Obtained by Forming Electroconductive Layers by Sputtering of Gold on Film of Three-Layer Structure Comprising VDF/HFP Copolymer Gel of Ionic Liquid (BMIBF$_4$) and Carbon Nanotube (1) Preparation of a Gel Composition Comprising a Single Wall Carbon Nanotube (SWNT) and BMIBF$_4$:

SWNT (63 mg) and BMIBF$_4$ (245 mg) were kneaded for 15 minutes to prepare a composition in the form of gel comprising 21% by weight of SWNT.

(2) Preparation of a Film of Three-Layer Structure by Sandwiching a VDF/HFP Copolymer of an Ionic Liquid Between SWNTs:

A film of three-layer structure was produced in the same manner as in Comparative Example 1. For the first layer (electrode layer) and the third layer (electrode layer), the gel composition of SWNT (160 mg) prepared in (1) above, a VDF/HFP copolymer (VDF:HFP=88:12, 80 mg) and MIBK (1.5 ml) were mixed. For the second layer (ion-conducting layer) sandwiched therebetween, BMIBF$_4$ (163 mg), a VDF/HFP copolymer (VDF:HFP=88:12, 82 mg) and MIBK (0.6 ml) were mixed.

(3) Preparation of a Film of Five-Layer Structure

Gold was deposited as electroconductive layers by a sputtering method on the both surfaces of the film of three-layer structure prepared in (2) above (sputtering machine for producing scanning electron microscope samples was used, and each side is subjected to sputtering at 20 mA for 20 minutes).

(4) Evaluation of Responsivity of a Film of Five-Layer Structure:

Evaluation of responsivity was conducted in the same manner as in Comparative Example 1. Table 10 shows a value of an applied 0.1 Hz square-wave voltage and a response displacement at that time.

TABLE 10

|  | Voltage (V) | | | |
| --- | --- | --- | --- | --- |
|  | 2 | 3 | 4 | 5 |
| Displacement (mm) | 0.47 | 0.77 | 1.18 | 1.79 |

Example 8

Film of Five-Layer Structure Obtained by Forming Electroconductive Layers by Sputtering of Gold on Film of Three-Layer Structure Comprising VDF/HFP/OH Group-Containing Fluorine-Containing Allyl Ether Copolymer of Ionic Liquid (BMIBF$_4$) and Carbon Nanotube (1) Preparation of a Gel Composition Comprising a Single Wall Carbon Nanotube (SWNT) and BMIBF$_4$:

SWNT (63 mg) and BMIBF$_4$ (245 mg) were kneaded for 15 minutes to prepare a composition in the form of gel comprising 21% by weight of SWNT.

(2) Preparation of a Film of Three-Layer Structure by Sandwiching the VDF/HFP/OH Group-Containing Fluorine-Containing Allyl Ether Copolymer of an Ionic Liquid Prepared in Synthesis Example 2 Between SWNTs:

A film of three-layer structure was produced in the same manner as in Example 1. For the first layer (electrode layer) and the third layer (electrode layer), the SWNT gel (160 mg) prepared in (1) above, the VDF/HFP/OH group-containing fluorine-containing allyl ether copolymer (VDF:HFP:OH group-containing fluorine-containing allyl ether=88:5:7, 80 mg) prepared in Synthesis Example 2 and MIBK (1.5 ml) were mixed. For the second layer (ion-conducting layer) sandwiched therebetween, BMIBF$_4$ (163 mg), the VDF/HFP/OH group-containing fluorine-containing allyl ether copolymer (VDF:HFP:OH group-containing fluorine-containing allyl ether=82:11:7, 82 mg) and MIBK (0.6 ml) were mixed.

(3) Preparation of a Film of Five-Layer Structure

Gold was deposited as electroconductive layers by a sputtering method on the both surfaces of the film of three-layer structure prepared in (2) above (sputtering machine for producing scanning electron microscope samples was used, and each side is subjected to sputtering at 20 mA for 20 minutes).

(4) Evaluation of Responsivity of a Film of Five-Layer Structure:

Evaluation of responsivity was conducted in the same manner as in Example 1. Table 11 shows a value of an applied 0:1 Hz square-wave voltage and a response displacement at that time.

TABLE 11

|  | Voltage (V) | | | |
| --- | --- | --- | --- | --- |
|  | 2 | 3 | 4 | 5 |
| Displacement (mm) | 0.55 | 0.83 | 1.24 | 1.98 |

INDUSTRIAL APPLICABILITY

According to the present invention, there can be provided an actuator element which can be driven at low voltages, is operated stably with a quick response in air and in vacuo, exhibits a large degree of displacement and a large displacement force, has high mechanical strength including flexibility, thus giving long-term durability for repeated use, can be produced by a very simple method, can be formed into a small size because of a simple structure, and can be put into practical use in wide applications.

The invention claimed is:

1. An electrode layer for an actuator element comprising (I) a fluorine-containing polymer having functional group, (II) an ionic liquid and (III) an electroconductive nano-filler, wherein said fluorine-containing polymer (I) having functional group is a polymer having functional group selected from the group consisting of —OH, —COOH, —COOR, —CN, iodine atom, epoxy group and (meth)acryloyl group in a polymer side chain and/or at an end of a polymer trunk chain.

2. The electrode layer for an actuator element of claim 1, wherein said fluorine-containing polymer (I) having functional group is a fluorine-containing polymer (Ia) having functional group and represented by the formula (I):

 (1)

in which the structural unit M is a structural unit derived from a fluorine-containing ethylenic monomer and represented by the formula (M):

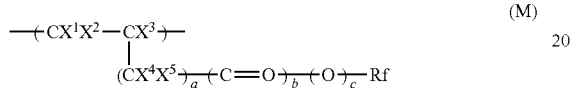 (M)

wherein $X^1$ and $X^2$ are the same or different and each is H or F; $X^3$ is H, F, $CH_3$ or $CF_3$; $X^4$ and $X^5$ are the same or different and each is H, F or $CF_3$; Rf has 1 to 5 functional groups Y, where Ys are the same or different and each is —OH, —COOH, —COOR, —CN, iodine atom, epoxy group or (meth)acryloyl) group., and is a fluorine-containing alkyl group having 1 to 50 carbon atoms excluding carbon atoms contained in the functional group or a fluorine-containing alkyl group having ether bond and 2 to 100 carbon atoms excluding carbon atoms contained in the functional group; a is 0 or an integer of from 1 to 10; b and c are the same or different and each is 0 or 1, the structural unit A is a structural unit derived from a monomer copolymerizable with the fluorine-containing ethylenic monomer providing the structural unit represented by the formula (M), and the structural unit M and the structural unit A are contained in amounts of from 0.1 to 100% by mole and from 0 to 99.9% by mole, respectively.

3. An actuator element comprising an ion-conducting layer and at least two electrode layers formed on the surfaces of the ion-conducting layer and insulated from each other, in which flection or deformation can be caused by applying an electric potential difference to said electrode layers, said at least two electrode layers each independently comprises (I) a fluorine-containing polymer having functional group, (II) an ionic liquid and (III) an electroconductive nano-filler, said fluorine-containing polymer (I) having functional group is a polymer having functional group selected from the group consisting of —OH, —COOH, —COOR, —CN, iodine atom, epoxy group and (meth)acryloyl group in a polymer side chain and/or at an end of a polymer trunk chain, and said ion-conducting layer comprising (I) a fluorine-containing polymer having functional group and (II) an ionic liquid, wherein said fluorine-containing polymer (I) having functional group is a polymer having functional group selected from the group consisting of —OH, —COOH, —COOR, —CN, iodine atom, epoxy group and (meth)acryloyl group in a polymer side chain and/or at an end of a polymer trunk chain.

4. The actuator element of claim 3, wherein said fluorine-containing polymer (I) having functional group is a fluorine-containing polymer (Ia) having functional group and represented by the formula (I):

 (1)

in which the structural unit M is a structural unit derived from a fluorine-containing ethylenic monomer and represented by the formula (M):

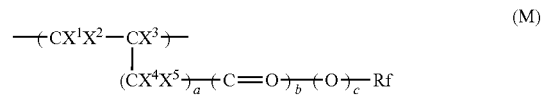 (M)

wherein $X^1$ and $X^2$ are the same or different and each is H or F; $X^3$ is H, F, $CH_3$ or $CF_3$; $X^4$ and $X^5$ are the same or different and each is H, F or $CF_3$; Rf has 1 to 5 functional groups Y, where Ys are the same or different and each is —OH, —COOH, —COOR, —CN, iodine atom, epoxy group or (meth)acryloyl group, and is a fluorine-containing alkyl group having 1 to 50 carbon atoms excluding carbon atoms contained in the functional group or a fluorine-containing alkyl group having ether bond and 2 to 100 carbon atoms excluding carbon atoms contained in the functional group; a is 0 or an integer of from 1 to 10; b and c are the same or different and each is 0 or 1, the structural unit A is a structural unit derived from a monomer copolymerizable with the fluorine-containing ethylenic monomer providing the structural unit represented by the formula (M), and the structural unit M and the structural unit A are contained in amounts of from 0.1 to 100% by mole and from 0 to 99.9% by mole, respectively.

5. An actuator element comprising an ion-conducting layer, at least two electrode layers formed on the surfaces of the ion-conducting layer and insulated from each other, and electroconductive layers formed on the surfaces of the electrode layers, in which flection or deformation can be caused by applying an electric potential difference to the electroconductive layers, said at least two electrode layers each independently comprises (I) a fluorine-containing polymer having functional group, (II) an ionic liquid and (III) an electroconductive nano-filler, said fluorine-containing polymer (I) having functional group is a polymer having functional group selected from the group consisting of —OH, —COOH, —COOR, —CN, iodine atom, epoxy group and (meth)acryloyl group in a polymer side chain and/or at an end of a polymer trunk chain, and said ion-conducting layer comprising (I) a fluorine-containing polymer having functional group and (II) an ionic liquid, wherein said fluorine-containing polymer (I) having functional group is a polymer having functional group selected from the group consisting of —OH, —COOH, —COOR, —CN, iodine atom, epoxy group and (meth)acryloyl group in a polymer side chain and/or at an end of a polymer trunk chain.

6. The actuator element of claim 5, wherein said fluorine-containing polymer (I) having functional group is a fluorine-containing polymer (Ia) having functional group and represented by the formula (I):

 (1)

in which the structural unit M is a structural unit derived from a fluorine-containing ethylenic monomer and represented by the formula (M):

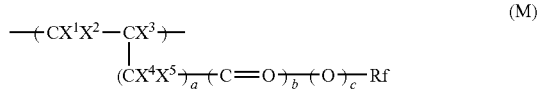
(M)

wherein $X^1$ and $X^2$ are the same or different and each is H or F; $X^3$ is H, F, $CH_3$ or $CF_3$; $X^4$ and $X^5$ are the same or different and each is H, F or $CF_3$; Rf has 1 to 5 functional groups Y, where Ys are the same or different and each is —OH, —COOH, —COOR, —CN, iodine atom, epoxy group or (meth)acryloyl group, and is a fluorine-containing alkyl group having 1 to 50 carbon atoms excluding carbon atoms contained in the functional group or a fluorine-containing alkyl group having ether bond and 2 to 100 carbon atoms excluding carbon atoms contained in the functional group; a is 0 or an integer of from 1 to 10; b and c are the same or different and each is 0 or 1, the structural unit A is a structural unit derived from a monomer copolymerizable with the fluorine-containing ethylenic monomer providing the structural unit represented by the formula (M), and the structural unit M and the structural unit A are contained in amounts of from 0.1 to 100% by mole and from 0 to 99.9% by mole, respectively.

7. A composition for forming an electrode layer for an actuator element comprising a fluorine-containing polymer (I) having functional group selected from the group consisting of —OH, —COOH, —COOR, —CN, iodine atom, epoxy group and (meth)acryloyl group in a polymer side chain and/or at an end of a polymer trunk chain, an ionic liquid (II) and an electroconductive nano-filler (III).

8. The composition for forming an electrode layer for an actuator element of claim 7, wherein said fluorine-containing polymer (I) having functional group is a fluorine-containing polymer (Ia) having functional group and represented by the formula (I):

(1)

in which the structural unit M is a structural unit derived from a fluorine-containing ethylenic monomer and represented by the formula (M):

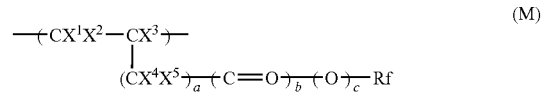
(M)

wherein $X^1$ and $X^2$ are the same or different and each is H or F; $X^3$ is H, F, $CH_3$ or $CF_3$; $X^4$ and $X^5$ are the same or different and each is H, F or $CF_3$; Rf has 1 to 5 functional groups Y, where Ys are the same or different and each is —OH, —COOH, —COOR, —CN, iodine atom, epoxy group or (meth)acryloyl group, and is a fluorine-containing alkyl group having 1 to 50 carbon atoms excluding carbon atoms contained in the functional group or a fluorine-containing alkyl group having ether bond and 2 to 100 carbon atoms excluding carbon atoms contained in the functional group; a is 0 or an integer of from 1 to 10; b and c are the same or different and each is 0 or 1, the structural unit A is a structural unit derived from a monomer copolymerizable with the fluorine-containing ethylenic monomer providing the structural unit represented by the formula (M), and the structural unit M and the structural unit A are contained in amounts of from 0.1 to 100% by mole and from 0 to 99.9% by mole, respectively.

* * * * *